United States Patent
Chen

(10) Patent No.: US 8,509,565 B2
(45) Date of Patent: Aug. 13, 2013

(54) OPTIMAL MULTI-RESOLUTION BLENDING OF CONFOCAL MICROSCOPE IMAGES

(75) Inventor: Yung-Chang Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/474,826

(22) Filed: May 18, 2012

(65) Prior Publication Data

US 2012/0237137 A1 Sep. 20, 2012

Related U.S. Application Data

(63) Continuation-in-part of application No. 12/334,808, filed on Dec. 15, 2008, now abandoned.

(51) Int. Cl.
*G06K 9/36* (2006.01)
*G06K 9/00* (2006.01)

(52) U.S. Cl.
USPC .......................................... 382/284; 382/128

(58) Field of Classification Search
USPC ................. 382/100, 128, 278, 282, 284, 294, 382/299
See application file for complete search history.

(56) References Cited

U.S. PATENT DOCUMENTS

| 7,365,310 | B2 | 4/2008 | Truche et al. |
| 7,978,932 | B2 | 7/2011 | Vercauteren et al. |
| 2005/0225849 | A1* | 10/2005 | Gouch .......................... 359/385 |
| 2010/0149183 | A1 | 6/2010 | Loewke et al. |

OTHER PUBLICATIONS

USPTO Office Action for U.S. Appl. No. 12/334,808 (Parent Application) Mailed Dec. 1, 2011.

* cited by examiner

*Primary Examiner* — Yon Couso

(57) ABSTRACT

The disclosure concerns a method for optimizing multiresolution blending of confocal microscope images including the steps of: the multi-band blender proceeding pyramidal correlations; the multi-band blender collecting numerical information from each row of a Laplacian image; the multi-band blender integrating the numerical information from a Laplacian domain of pyramid representation; the multi-band blender measuring the discrepancy between adjacent rows; and the multi-band blender optimizing the overlapped region by estimating the best blending coefficients.

6 Claims, 23 Drawing Sheets

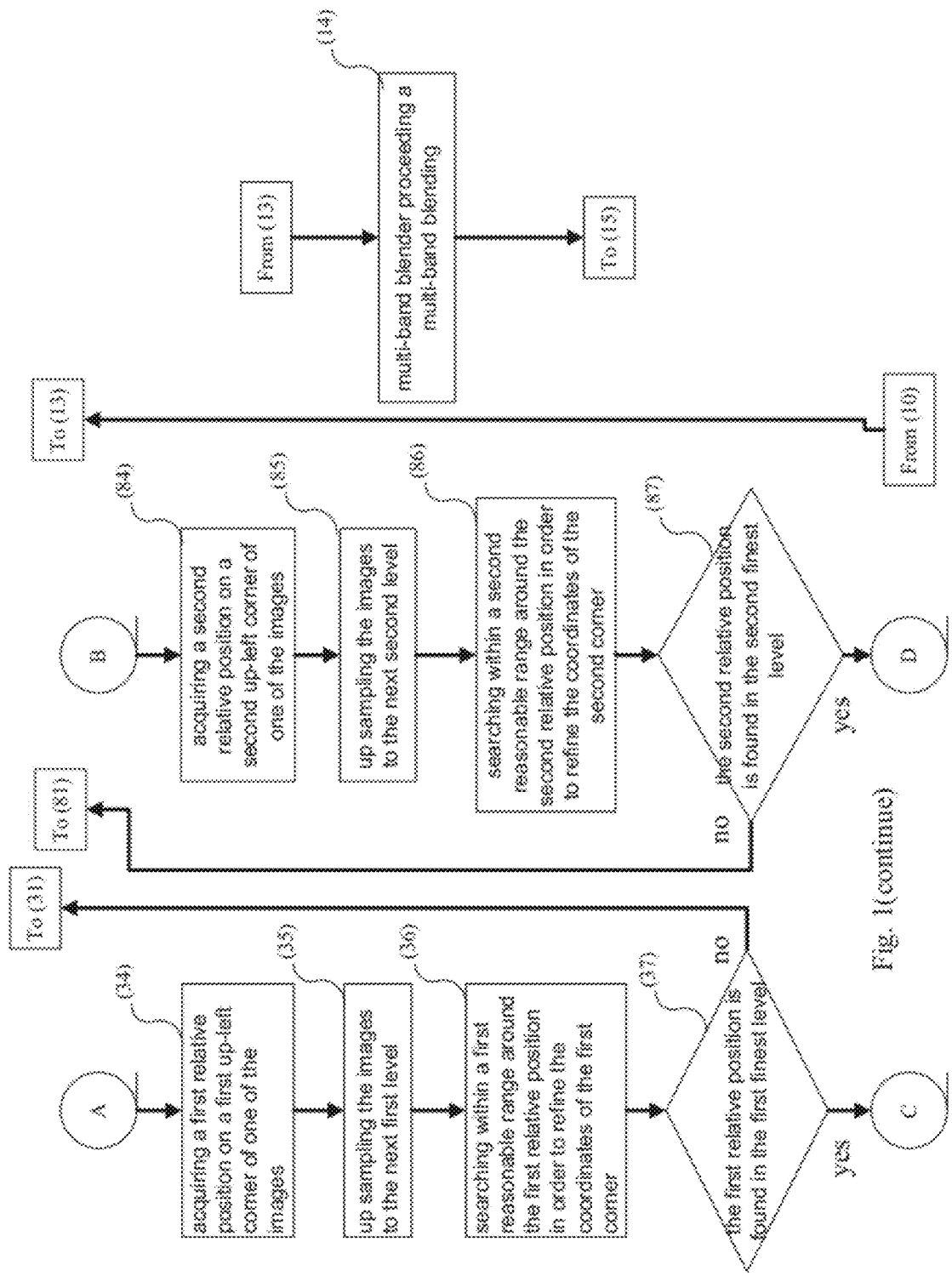
Fig. 1 (continue)

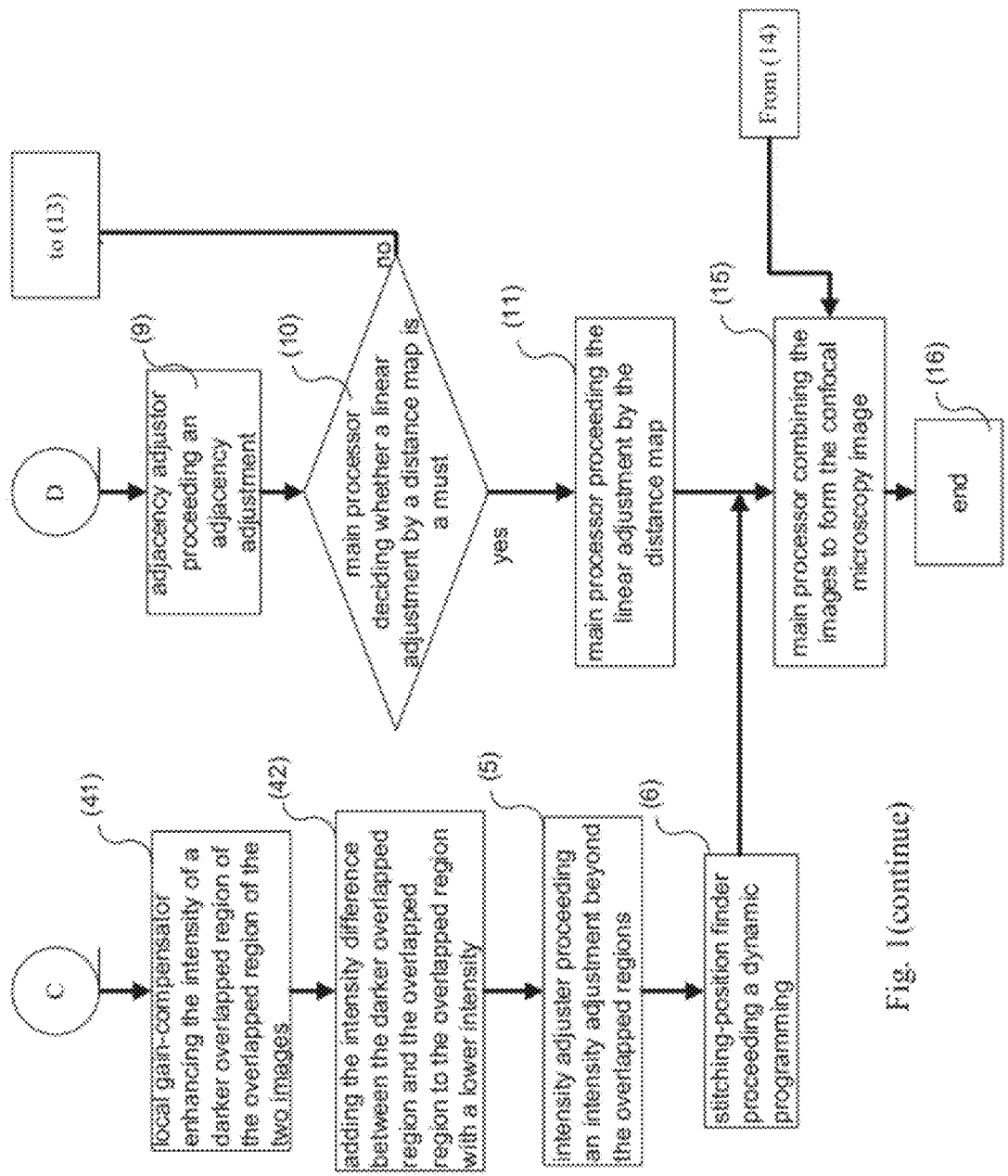
Fig. 1(continue)

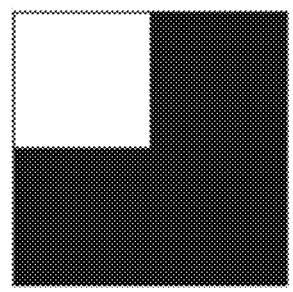
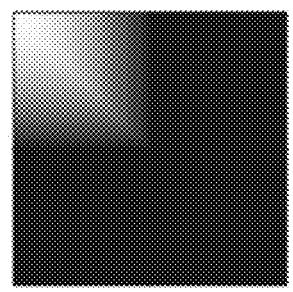
Fig. 11A            Fig. 11B
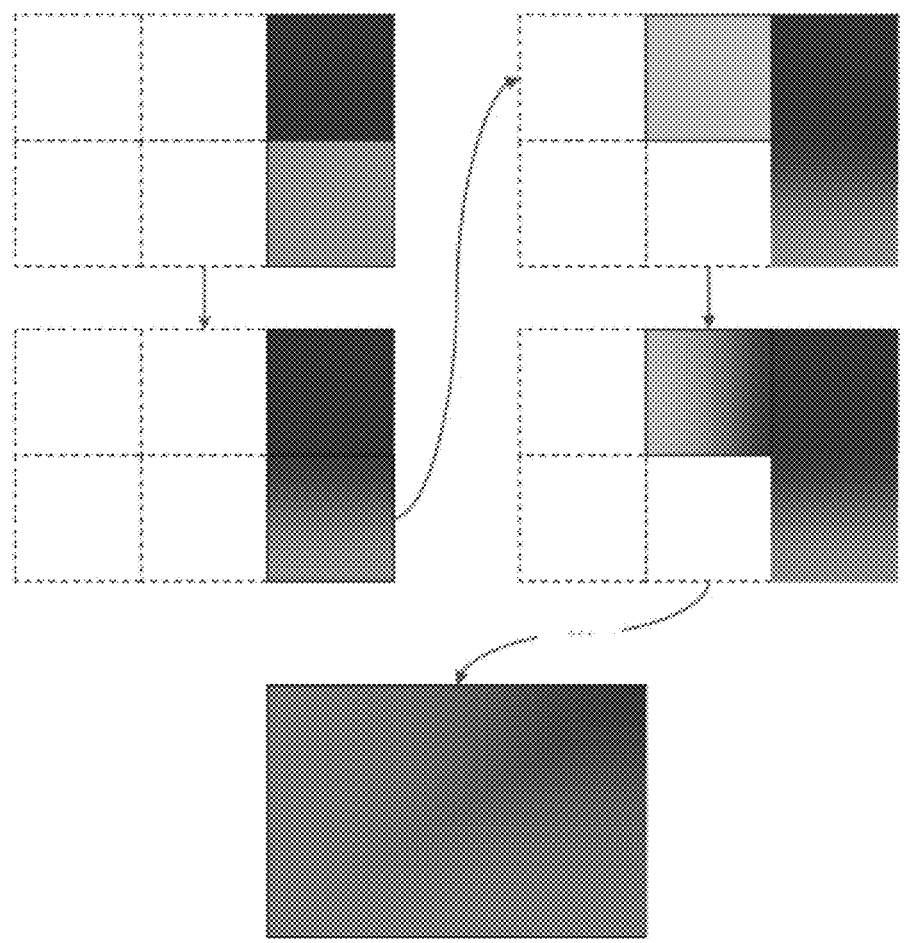
Fig. 12

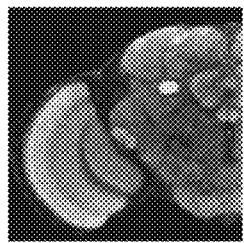 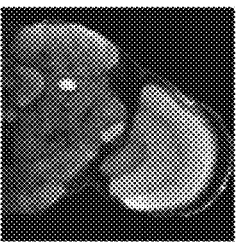 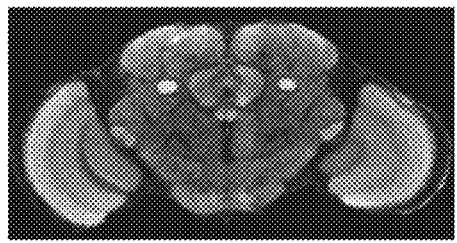
Fig. 17A  Fig. 17B
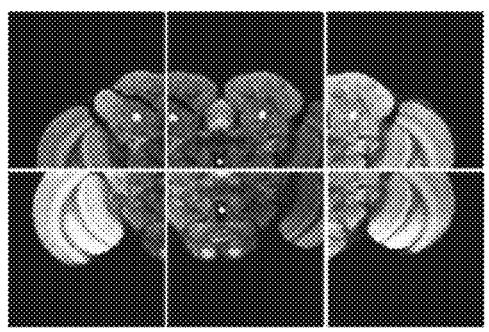 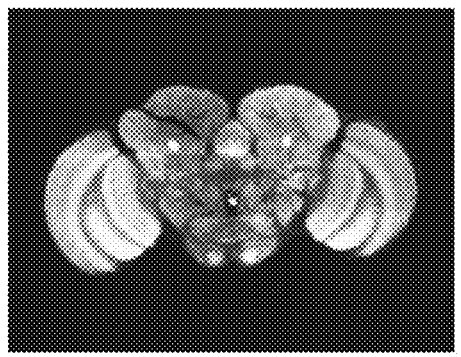
Fig. 18A  Fig. 18B

OPTIMAL MULTI-RESOLUTION BLENDING OF CONFOCAL MICROSCOPE IMAGES

CROSS-REFERENCE TO RELATED APPLICATION

This application is a continuation-in-part of a co-pending U.S. patent application Ser. No. 12/334,808 for "METHOD FOR COMPOSING CONFOCAL MICROSCOPY IMAGE WITH HIGHER RESOLUTION" filed on Dec. 15, 2008, the content of which is hereby incorporated by reference in its entirety.

BACKGROUND OF THE INVENTION

1. Field of the Invention

The present invention generally relates to a method for optimizing multi-resolution blending of confocal microscope images, more particularly to a method that can achieve seamless image stitching for eliminating obvious visual artifacts caused by severe intensity discrepancy, image distortion and structure misalignment by pyramidal correlation, intensity adjustment, dynamic programming, SIFT, multi-band blending.

2. Description of the Prior Art

To understand the structure and functions of the human brains' neural networks is important but difficult due to its huge number of neuropils and complex functions. To simplify this problem, in the research of life science, fruit flies are chosen because of the number of cells and neuropils in a fruit fly's brain are much fewer and it is easier to get large number of their samples.

The first step of research is to combine a lot of data images. For higher-resolution pictures, confocal microscopy images of fluorescent dyeing fruit flies brains are taken, whose slice images consist of two or four or six overlapping parts at x-y plane and one stacking part at z-coordinate. An image stack might be composed of hundreds of slices, all numbered by z-coordinate, and because of tiny inaccuracy, the same sequence number of picture in different stacks might not present exactly the same z-coordinate. Another problem of fluorescent images is that fluorescence might be decayed by time within a shot. This makes intensity compensation of pictures difficult. In this invention, we try a few methods to solve these problems and obtain acceptable results.

To figure out the disadvantages may be an important issue to the persons skilled in the arts in order to develop a method for composing a confocal microscopy image with a higher resolution.

SUMMARY OF THE INVENTION

The primary objective of the present invention is to optimize multi-resolution blending of confocal microscope images in order to achieve seamless image stitching for eliminating obvious visual artifacts caused by severe intensity discrepancy, image distortion and structure misalignment, given that the input images are globally registered. This approach is based on structure deformation and propagation while maintaining the overall appearance affinity of the result to the input images. This new approach is proven to be effective in solving the above problems, and has found applications in mosaic deghosting, image blending and intensity correction.

The aim of a stitching algorithm is to produce a visually plausible mosaic with two desirable properties. First, the mosaic should be as similar as possible to the input images, both geometrically and photometrically. Second, the seam between the stitched images should be invisible. While these requirements are widely acceptable for visual examination of a stitching result, their definition as quality criteria was either limited or implicit in previous approaches.

The method for composing a confocal microscopy image with a higher resolution comprising the steps of: (1) a main processor confirming the number of images stored in a database; (2) the main processor deciding whether the number of images stored in the database to be stitched are more than two, if no, going to step (3), otherwise, going to step (7); (3) a multiscale correlation estimator proceeding pyramidal correlations; (4) a local gain-compensator gaining compensation for the overlapped region of the two images; (5) an intensity adjuster proceeding an intensity adjustment beyond the overlapped regions; (6) a stitching-position finder proceeding a dynamic programming, then going to step (15); (7) the main processor deciding whether the pyramidal correlation is a must, if yes, going step (8), otherwise, going to step (12); (8) the multiscale correlation estimator proceeding the pyramidal correlations; (9) an adjacency adjustor proceeding an adjacency adjustment; (10) the main processor deciding whether a linear adjustment by a distance map is a must, if yes, going to step (11), otherwise, going to step (13); (11) the main processor proceeding the linear adjustment by the distance map; (12) the main processor proceeding an scale invariant feature transform (SIFT); (13) a global gain compensator executing a gain compensation for the all images; (14) a multi-band blender proceeding a multi-band blending; and; (15) the main processor combining the images to form the confocal microscopy image.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objectives, spirits, and advantages of the preferred embodiments of the present invention will be readily understood by the accompanying drawings and detailed descriptions, wherein:

FIG. 6A and FIG. 6B illustrates a schematic view of two correlation conditions, wherein FIG. 5A is that of correlated one but wrong match and FIG. 5B is a nice match;

FIG. 11A and FIG. 11B illustrate a schematic view of two adjacent regions and a schematic view of a distance map of the two adjacent regions;

FIG. 12 illustrates a schematic view of sequential stages of combining two images;

FIG. 17A and FIG. 17B illustrate a view of two input microscopy images and a result view of a combination of applying Equation (1-6) on the two input microscopy images;

FIG. 18A and FIG. 18B illustrate a view of six input microscopy images and a result view of a combination of applying linear adjustment by distance map on the six input microscopy images;

DETAILED DESCRIPTION OF THE INVENTION

Figure 1:
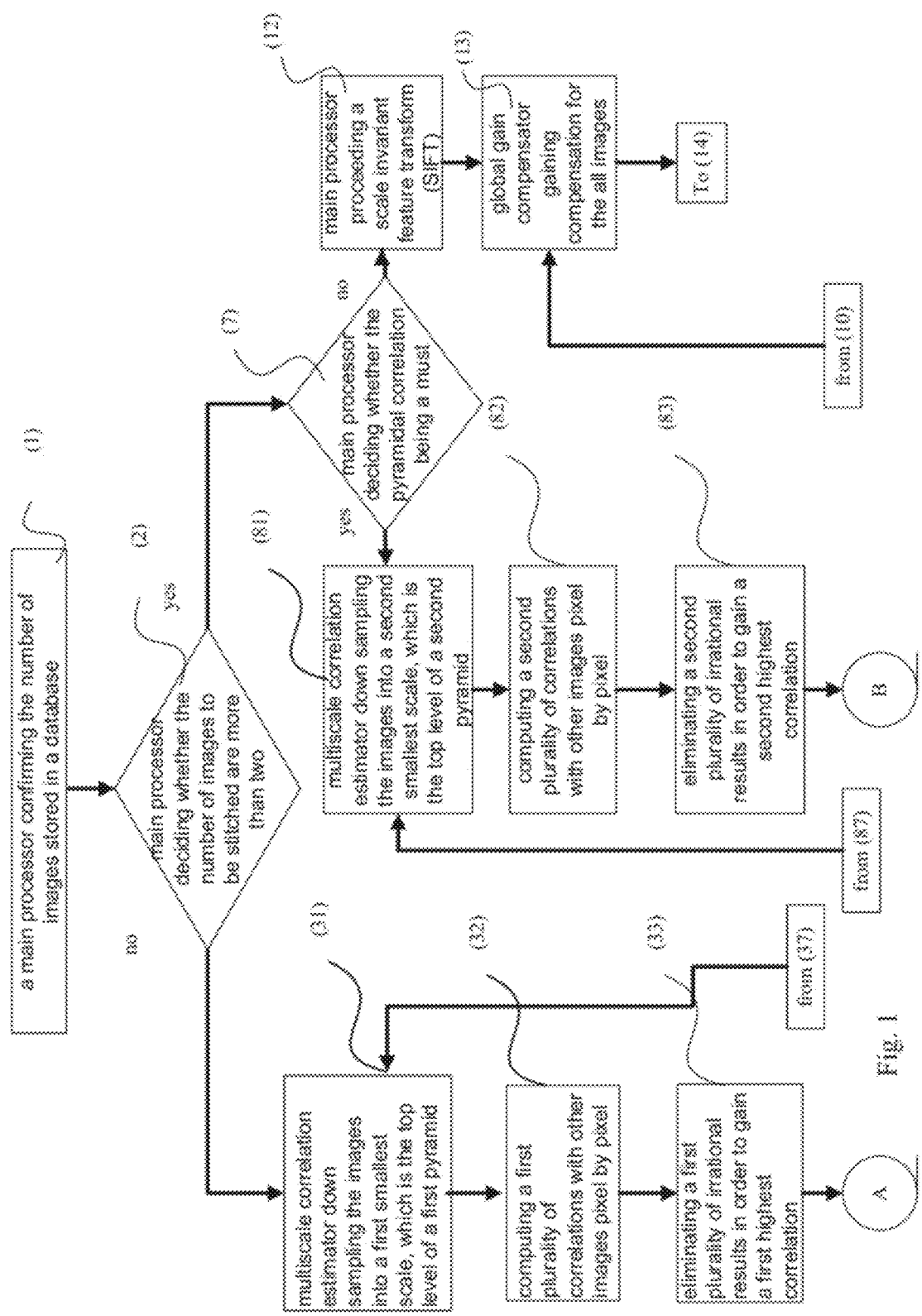
FIG. 1 illustrates a flow chart of a method for composing a confocal microscopy image with a higher resolution of the present invention.

With reference to FIG. 1, which illustrates a flow chart of a method for composing a confocal microscopy image with a higher resolution of the present invention. The method includes the steps of:

(1) a main processor confirming the number of images stored in a database;

(2) the main processor deciding whether the number of images stored in the database to be stitched are more than two, if no, going to step (3), otherwise, going to step (7);

(31) a multiscale correlation estimator down-sampling the images stored in the database into a first smallest scale, which is the top level of a first pyramid;

(32) the multiscale correlation estimator computing a first plurality of correlations with other images pixel by pixel;

(33) the multiscale correlation estimator eliminating a first plurality of irrational results in order to gain a first highest correlation;

(34) the multiscale correlation estimator acquiring a first relative position on a first upper-left corner of one of the images;

(35) the multiscale correlation estimator up-sampling the images to the next first level;

(36) the multiscale correlation estimator searching within a first reasonable range around the first relative position in order to refine the coordinates of the first corner;

(37) the multiscale correlation estimator determining whether the first relative position is found in the first finest level, if yes, going to step (4), otherwise, going to step (31);

(41) a local gain-compensator enhancing the intensity of a darker overlapped region of the overlapped region of the two images stored in the database;

(42) the local gain-compensator adding the intensity difference between the darker overlapped region and the overlapped region to the overlapped region with lower intensity;

(5) an intensity adjuster proceeding an intensity adjustment beyond the overlapped regions;

(6) a stitching-position finder proceeding a dynamic programming, then going to step (15);

(7) the main processor deciding whether the pyramidal correlation is a must, if yes, going step (81), otherwise, going to step (12);

(81) the multiscale correlation estimator down-sampling the images stored in the database into a second smallest scale, which is the top level of a second pyramid;

(82) the multiscale correlation estimator computing a second plurality of correlations with other images pixel by pixel;

(83) the multiscale correlation estimator eliminating a second plurality of irrational results in order to gain a second highest correlation;

(84) the multiscale correlation estimator acquiring a second relative position on a second upper-left corner of one of the images;

(85) the multiscale correlation estimator up-sampling the images to the next second level;

(86) the multiscale correlation estimator searching within a second reasonable range around the second relative position in order to refine the coordinates of the second corner; and

(87) the multiscale correlation estimator determining whether the second relative position is found in the second finest level, if yes, going to step (9), otherwise, going to step (81);

(9) an adjacency adjustor proceeding an adjacency adjustment;

(10) the main processor deciding whether a linear adjustment by a distance map is a must, if yes, going to step (11), otherwise, going to step (13);

(11) the main processor proceeding the linear adjustment by the distance map;

(12) the main processor proceeding a scale invariant feature transform (SIFT);

(13) a global gain compensator executing gain compensation for the all images;

(14) a multi-band blender proceeding a multi-band blending; and

(15) the main processor combining the images to form the confocal microscopy image.

Figure 2:
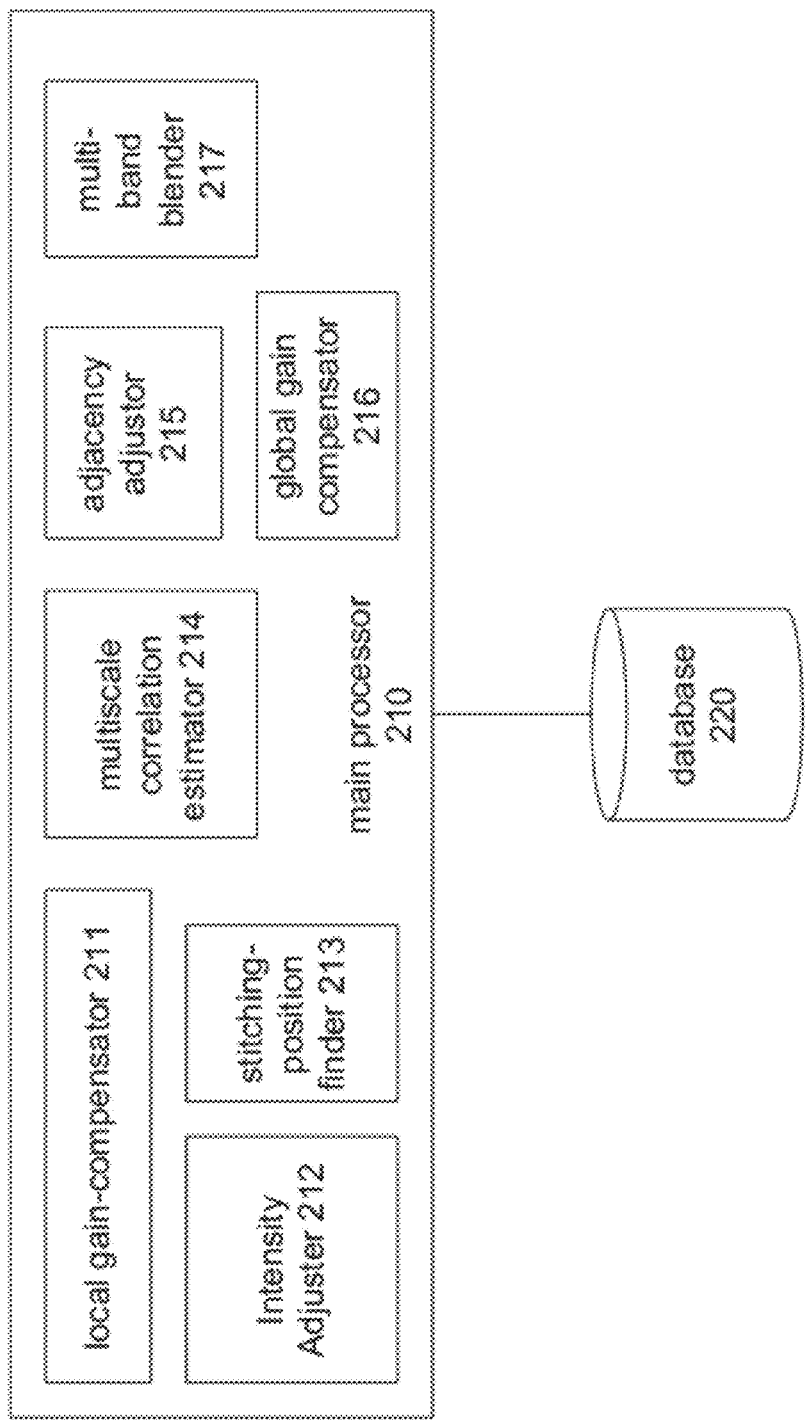
FIG. 2 illustrates a block diagram of a system for composing a confocal microscopy image with a higher resolution of the present invention

With reference to FIG. 2 which illustrates a block diagram of a system for composing a confocal microscopy image with a higher resolution of the present invention. A system for composing a confocal microscopy image with a higher resolution includes a main processor 210 and a database 220 connected with the main processor 210, wherein the main processor 210 further includes a local gain-compensator 211, an intensity adjuster 212, a stitching-position finder 213, a multiscale correlation estimator 214, an adjacency adjustor 215, a global gain compensator 216 and a multi-band blender 217. The main processor 210 is capable of confirming the number of images, deciding whether the numbers of images to be stitched are more than two, the pyramidal correlations is a must, and the linear adjustment by a distance map is a must, proceeding linear adjustment and scale invariant feature transform, and combining the images to form the confocal microscopy. The local gain-compensator 211 configures to gain compensation for the overlapped region of the two images. The intensity adjuster 212 is configured to proceed the intensity adjustment beyond the overlapped regions. The stitching-position finder 213 is configured to proceed the dynamic programming. The multiscale correlation estimator 214 is configured to proceed the pyramidal correlations. The adjacency adjustor 215 is configured to proceed the adjacency adjustment. The global gain compensator 216 is configured to execute the gain compensation. The multi-band blender is configured to proceed the multi-band blending. The database 220 is able to store at least one image.

For step (6), which is related the dynamic programming and an algorithm design method that can be used when the solution to a problem may be viewed as the result of a sequence of decisions. It is a very robust technique for searching optimal alignments between various types of patterns because it is able to include order and continuity constraints during the search. However, it is applicable only for the search of mono-dimensional alignments (the reason is that no natural order can be found for a multidimensional set) and uneasy to use directly for image matching although some attempts have been made. The word "programming" in "dynamic programming" has no particular connection to computer programming at all, and instead comes from the term "mathematical programming", a synonym for optimization. Thus, the "program" is the optimal plan for action that is produced. The dynamic programming is a method of solving problems exhibiting the properties of overlapping sub-problems and optimal substructure (described below) that takes much less time than naive methods. The dynamic programming usually takes two approaches listed below:

Top-down approach: The problem is broken into sub-problems, and these sub-problems are solved and the solutions remembered, in case they need to be solved again. This is recursion and memorization combined together.

Bottom-up approach: All sub-problems that might be needed are solved in advance and then used to build up solutions to larger problems. This approach is slightly better in stack space and number of function calls, but it is sometimes not intuitive to figure out all the sub-problems needed for solving the given problem.

The dynamic programming is originally used in texture synthesis, reducing blackness of the boundary between blocks. It is computed as a minimum cost path through the error surface at the overlap. We want to make the cut between two overlapping blocks on the pixels where the two textures match best. That is, the overlap error is the lowest. This can easily be done with the dynamic programming. Dijkstra's algorithm can be used as well.

Figure 3:
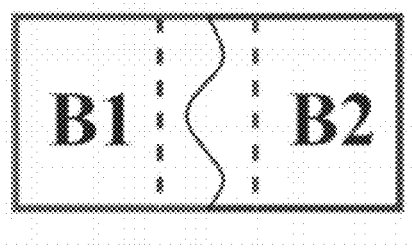
FIG. 3 illustrates a schematic view of a minimum error boundary cut using dynamic programming.

The minimal cost path through the error surface is computed in the following manner. With reference to FIG. 3, which illustrates a schematic view of a minimum error boundary cut using dynamic programming. If B1 and B2 are two blocks that overlap along their vertical edge with the regions of overlap $B_1^{ov}$ and $B_2^{ov}$, respectively, then the error surface is defined as $e=(B_1^{ov}-B_2^{ov})^2$. To find the minimal vertical cut through this surface we traverse e(i=2 ... N) and compute the cumulative minimum error E for all paths:

$$E_{i,j}=e_{i,j}+\min(E_{i-1,j-1},E_{i-1,j},E_{i-1,j+1}). \quad (1\text{-}1)$$

In the end, the minimum value of the last row in E will indicate the end of the minimal vertical path though the surface and one can trace back and find the path of the best cut. Similar procedure can be applied to horizontal overlaps. When there are both vertical and horizontal overlaps, the minimal paths meet in the middle and the overall minimum is chosen for the cut.

In our experiment, we choose to use the dynamic programming at the beginning while the number of pictures is two. We treat two images as two huge blocks and try to find the shortest path of the overlap of the two images. It did a great work for combing two pictures and with a little modification with intensities, we could obtain satisfactory results.

But by the growing number of pictures to be stitched, dynamic programming is no more applicable because of the shapes of overlaps could be various. In other words, in the case of combing more than two images, we do not use the dynamic programming to eliminate seam.

Correlation provides one of the most common and most useful statistics. Correlation computation yields a single number that describes the degree of matching relationship between two random variables. Though it is a simple method, it produces good outcomes for the present invention.

For two random variables X and Y, their data pairs are $(x_i, y_i)$, i=1, 2, ..., n. Its mean and variance are $\bar{x}$ and $s_X$, $\bar{y}$ and $s_Y$, respectively. Then correlation r is determined as $$r=\frac{1}{n-1}\sum_{i=1}^{n}\left(\frac{x_i-\bar{x}}{s_X}\right)\left(\frac{y_i-\bar{y}}{s_Y}\right) \quad (1\text{-}2)$$

For the preferred embodiment, we consider six variables (stand for six pictures) at a time; we will get a data matrix which is correlation matrix. Because more pictures are to be computed to form a correlation matrix for further analysis, to shorten time, pyramidal correlation is used.

Figure 4:
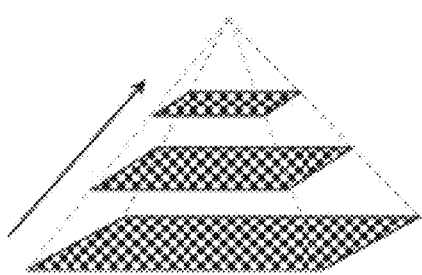
FIG. 4 illustrates a schematic view of down-sampled images arranged in order.
Figure 5:
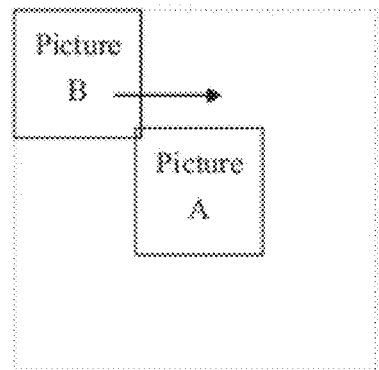
FIG. 5 illustrates a schematic view of correlation computation pixel by pixel.
Figure 6A:
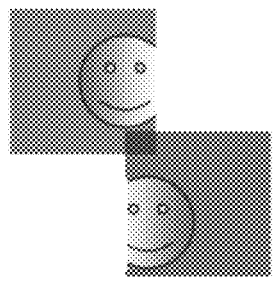
Figure 6B:
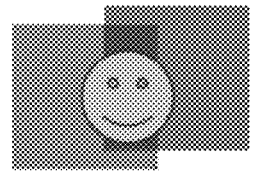
Figure 7:
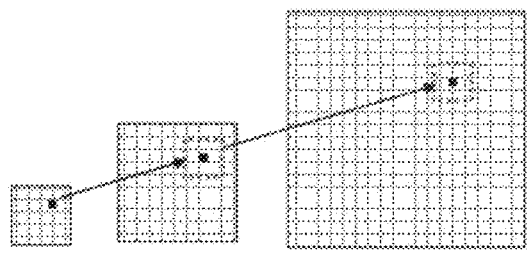
FIG. 7 illustrates a schematic view of a search range of a next level (dashed line)

First of all, down-sampling images into the smallest scale, referring to FIG. 4, which illustrates a schematic view of down-sampled images arranged in order. By computing correlations with other pictures pixel by pixel, referring to FIG. 5, which illustrates a schematic view of correlation computation pixel by pixel, where dotted lines mark the search range of B, and eliminating irrational results, we add a threshold on variance $s_X$ and $s_Y$, this is because the images all have background of zero intensity and if overlapping regions are all zero pixels and make correlation one, referring to FIG. 6A and FIG. 6B, which illustrates a schematic view of two correlation conditions, wherein FIG. 6A is that of correlation one but wrong match and FIG. 6B is a nice match. We could get the highest correlation and know the relative position lies on the upper-left corner. Then we up-sample images to the next level, and search within a reasonable range around the new position to refine the coordinates of the corner we've gotten before FIG. 7, which illustrates a schematic view of a search range of a next level (dashed line). Repeat the procedure until the position of overlapping is found in the finest level.

The diagonal of a correlation matrix (i.e., the numbers that go from the upper-left corner to the lower right) always consists of ones. That's because these are the correlations between each variable and itself (and a variable is always perfectly correlated with itself). And in our case, we only need correlation between different pictures, so we can skip these operations.

Otherwise, this program only computes the upper triangle of the correlation matrix. In every correlation matrix there are two triangular parts that lie below and to the left of the diagonal (lower triangle) and above and to the right of the diagonal (upper triangle). The two triangles of a correlation matrix are always mirror images of each other (the correlation of variable x with variable y is always equal to the correlation of variable y with variable x).

TABLE 1

Correlation matrix (one of the experimental results)

|        | Img[0] | Img[1]   | Img[2]   | Img[3]   | Img[4]   | Img[5]   |
|--------|--------|----------|----------|----------|----------|----------|
| Img[0] |        | 0.930926 | 0.869357 | 0.463536 | 0.456217 | 0.898263 |
| Img[1] |        |          | 0.93184  | 0.576419 | 0.429544 | 0.581173 |
| Img[2] |        |          |          | 0.949069 | 0.536115 | 0.534995 |
| Img[3] |        |          |          |          | 0.917143 | 0.837898 |
| Img[4] |        |          |          |          |          | 0.913916 |
| Img[5] |        |          |          |          |          |          |

Highest correlation being first found after searching the entire correlation matrix (Table 1.), then we can decide the first image pair which is the pair <Img[2], Img[3]> as shown in Table 1. For continuity of pictures, we will search for the pair of the second highest correlation in the correlation matrix which has relations with the pictures in the image pair we already found. Continue the procedures until all pictures numbered (0~5) have appeared in the image pair list (Table 2.(a)). Each image pair represents not only two images are adjacent, but also the relative positions of the pictures. During the process, all positions of images where they should be located in a combined image were decided (Table 2.(b)).

TABLE 2

(a) Image pair list (b) x-y coordinates of each picture (result of Table 1.)

| (a)      |        |        | (b)    |            |
|----------|--------|--------|--------|------------|
| $1^{st}$ | Img[2] | Img[3] | Img[0] | (10, 0)    |
| $2^{nd}$ | Img[1] | Img[2] | Img[1] | (4, 798)   |
| $3^{rd}$ | Img[0] | Img[1] | Img[2] | (0, 1253)  |
| $4^{th}$ | Img[3] | Img[4] | Img[3] | (730, 1259)|
| $5^{th}$ | Img[4] | Img[5] | Img[4] | (739, 789) |
|          |        |        | Img[5] | (740, 26)  |

For the preferred embodiment, we compute six slices with all the same sequence number in six stacks and assume that they are all at the same z-coordinate. But one stack of confocal microscopy images might have a little inaccuracy with another at z-coordinate. Because of the situation, we try to find the images which lie on the same plane really.

To solve the problem, we define a weight C which is the average of all correlations in the list of image pairs. We see C as a parameter which can tell us how much the combination is likely to be on the same plane. By substituting adjacent pictures to have new combination, we can determine which one might be close to the desired set of six images on the same plane.

$$C = \frac{\sum_{all\ pairs\ in\ a\ image\ pair\ list} correlation\ of\ image\ pair}{number\ of\ image\ pairs} \quad (1\text{-}3)$$

TABLE 3

Image pair list

| $1^{st}$ | Img[2] | Img[3] |
| $2^{nd}$ | Img[1] | Img[2] |
| $3^{rd}$ | Img[0] | Img[1] |

TABLE 3-continued

Image pair list

| $4^{th}$ | Img[3] | Img[4] |
| $5^{th}$ | Img[4] | Img[5] |

But computing for six images and all the substitution cases (suppose the inaccuracy won't be over one adjacent slice), we might need to deal with $3^6$ (Take combing six pictures in (Table 1.) for example) combinations to get the final answer. To reduce the computation, here is a method used. Due to the search method of the image pair operated before, all the picture pairs have continuity. So we can use the advantage of the continuity to start computing which combination is the desired result.

First, we compute an image pair with substituting n−1, n, n+1 slice, and this process will need 9 computations. And then the best pair will be selected to do the next step, compute the correlation of the image pair and substitute only the undetermined slice. After 3 computations, pick the best pair and repeat the action until all six pictures are determined.

Figure 8:
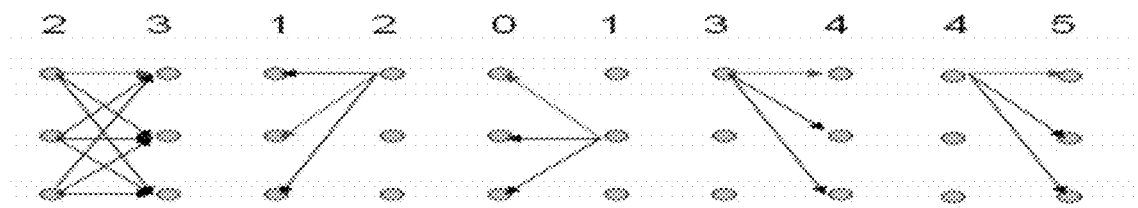
FIG. 8 illustrates a schematic view of a search method.

With reference to Table 3 and FIG. 8, which illustrate a table for an image pair list and a schematic view of a search method. The numbers on the top is the index k of Img[k]. Three rows of nodes from top to down stand for slice n−1, n, n+1 in different stacks. Red arrows mean the highest correlation selected in the stage been. Black arrows mean all the computation needed.

Due to the similarity of the combination between all pictures in six stacks, we can take advantage of the result. We chose about three consequent slices (more decisive ones) in each stack, and then through the procedure we can get the connections between slices of stacks. If six pictures are all of the same sequence number in the result of the program, it supposes the inaccuracy is less than one slice and we will use the relative positions of six pictures numbered the same in different stacks to combine all subsequent pictures in six stacks. Otherwise, we will take the difference of the slices and the relative positions between them into consideration to combine all subsequent slices in six stacks.

Figure 9A:
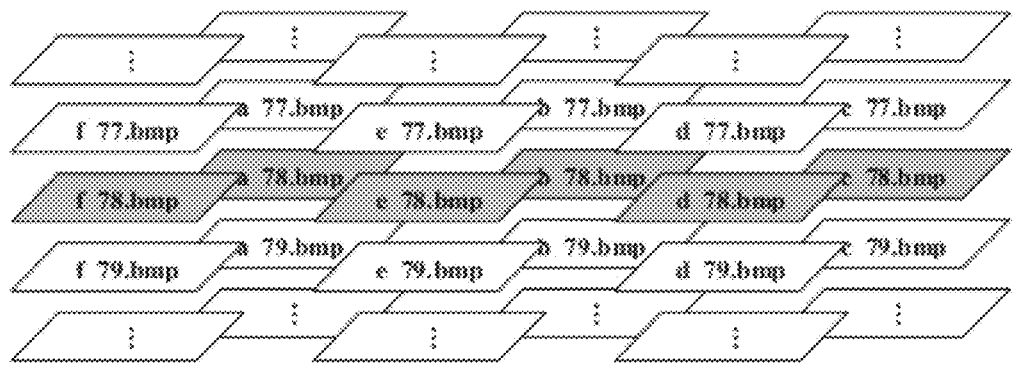
FIG. 9A and FIG. 9B illustrate a schematic view of ideal relationship between stacks and a schematic view of relationships between stacks in the experiment.
Figure 9B:
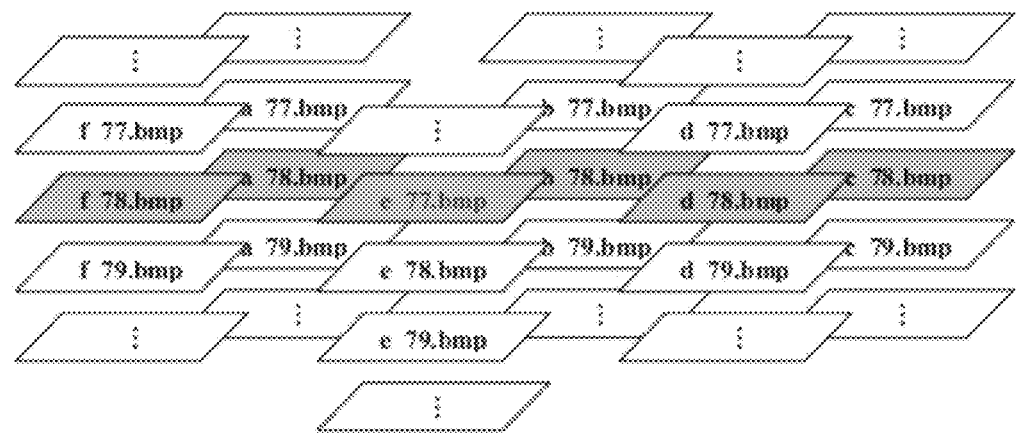

With reference to FIG. 9A and FIG. 9B, which illustrate a schematic view of ideal relationship between stacks and a schematic view of relationships between stacks in the experiment. For example, if we know that among the six stacks of slices the fifth needs to shift one slice downward to combine with the other stacks of slices to produce the best result of image blending. We will memorize the relative position of one of the combined results and shift every slice of the fifth stack in subsequent image-blending procedure. That will save a lot of time to re-compute the correlation of each pair of images for registration by taking the advantage of similar relationships among the stacks.

Back to step (12), which is that of proceeding a scale invariant feature transform, and it will be described below. SIFT (David G. Lowe, 2004), a condensation of Scale Invariant Feature Transform, as it transforms image data into scale-invariant coordinates relative to local features, is a novel and powerful algorithm to solve image matching problems. The major stages of computation used to generate the set of image features are as follows:

1. Scale-space extrema detection: The first stage of computation searches over all scales and image locations. It is implemented efficiently by using a difference-of-Gaussian function to identify potential interest points that are invariant to scale and orientation.
2. Keypoint localization: At each candidate location, a detailed model is fitted to determine location and scale. Keypoints are selected based on measures of their stability.
3. Orientation assignment: One or more orientations are assigned to each keypoint location based on local image gradient directions. All future operations are performed on image data that has been transformed relative to the assigned orientation, scale, and location for each feature, therefore providing invariance to these transformations.
4. Keypoint descriptor: The local image gradients are measured at the selected scale in the region around each keypoint. These are transformed into a representation that allows for significant levels of local shape distortion and change in illumination.

In David G. Lowe's another paper at 2007, *Automatic Panoramic Image Stitching using Invariant Features*, an excellent algorithm which is established on SIFT has been proposed to solve the problem of panorama stitching. It describes an invariant feature based approach to fully automatic panoramic image stitching. These invariant features enables reliable matching of panoramic image sequences despite rotation, zoom and illumination change in the input images. By viewing image stitching as a multi-image matching problem, it can automatically discover the matching relationships between the images, and recognize panoramas in unordered datasets. This algorithm has presented a novel system for fully automatic panorama stitching. The use of invariant local features and a probabilistic model to verify image matches allows us to recognize multiple panoramas in unordered image sets, and stitch them fully automatically without user input.

Although the automatic algorithm can solve a lot of image matching problems, but its parameters settings before running the program might be a considerable problem. In our experiment, by good settings of parameters, a few results are successfully combined through the Lowe's Algorithm and able to have wonderful effect.

According to step (31) to step (6) of FIG. 1, we consider about combing two images. After the image registration mentioned before, we obtain the relative positions of the images. Due to the attribute of the overlaps, we should adjust intensity of regions of overlaps. And then dynamic programming would be used to eliminate the seam. Otherwise, intensity adjustment would be used in the regions beyond the overlaps. Because of the characteristic of the confocal microscopy images, the adjustment is usually applied on the darker regions of the overlaps.

After previous work, intensity adjustment is needed to apply to the images. $I_k^{ov}(i,j)$ stands for regions of overlaps. In the case of two images combing, $\bar{I}_k^{ov}$ is the mean of $I_k^{ov}(i,j)$, for k=1~2

$$\bar{I}_k^{ov} = \frac{\sum_{i=1}^{m}\sum_{j=1}^{n} I_k^{ov}(i,j)}{m \times n} \quad (1\text{-}4)$$

If $\bar{I}_1^{ov} < \bar{I}_2^{ov}$, then we apply to region of overlap 1:

$$I_1^{ov'}(i,j) = I_1^{ov}(i,j) \times S, \quad (1\text{-}5)$$

$$S = \frac{\bar{I}_2^{ov}}{\bar{I}_1^{ov}}$$

To enhance intensity of darker overlap is the first step of our work. Due to the double exposures of the region of fruit flies' brains, fluorescent regions of overlaps will attenuate more than the other regions beyond overlaps. The region exposed twice would be darker than the region exposed once. To deal with this situation, we tried to add the difference between them to the region of overlap with lower intensity. But the effect is not quite well, since the structure is a little bit destroyed. This operation would make structures not clear. After applying (1-5), the darker region of overlaps will be brighter but seem not to lose most of the structure.

The region beyond the overlaps would have characteristic mentioned below: regions near the overlaps would attenuate more than the regions far from the overlaps. So, we try several times to overcome the problem and try to make the loss of the original data as less as possible.

We use a linear descending function decided by the distance of how far from the region of the overlap to apply functions to compensate the intensities. If x is distance of the pixel to the border to the overlap and D is the range of what we decided to compensate, then the ratio multiplied to the pixel is defined as m(x), $$m(x) = S - \left(\frac{S-1}{D}\right) \times x \quad (1\text{-}6)$$

Otherwise, we can choose other functions to substitute (1-6)

$$m(x) = (S-1) \times \frac{\exp^{D-x}}{\exp^{D}} + 1 \quad (1\text{-}7)$$

Figure 10:
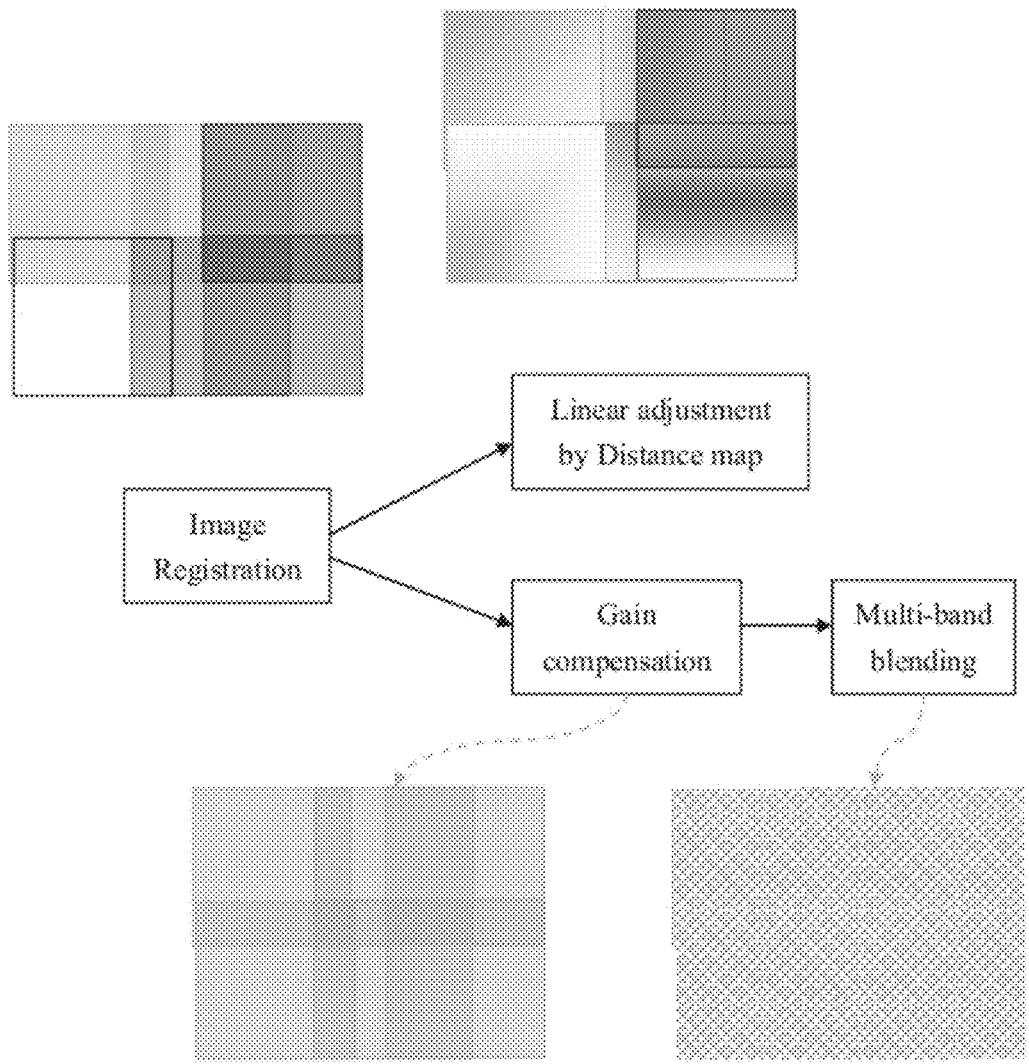
FIG. 10 illustrates a schematic view of a plurality of stages of image registration.

With reference to FIG. 10, which illustrates a schematic view of a plurality of stages of image registration. Therefore, for raising to higher resolution, fruit flies' brains have to be scanned into more parts. The shape and the attenuation of the regions of overlaps will be more complicated than the case of combing two images discussed before. On the other hand, images of fruit flies' brains scanned later need to raise the intensity manually because of the fluorescence attenuation, making the compensation of intensity harder. Therefore we could only try the best to make the combined image look like consistence, without much artificial impression.

Two methods have been used here. While combining the first two images, enhance the image which has lower average intensity by using distance map from the border of the overlap. In general case we will take the image with higher average intensity as the former scanned image, and the lower one as the later scanned image. So during the combining, encountering the regions of overlaps, we chose the overlap with higher average intensity to fill the blank. After combining theses two images, we see the resulting image as a new one, then re-compute the correlations between this one to the other images and choose the highest pair to do the combination. Repeat the procedure until there is only one picture remained. This method is quite intuitive and modifies only a part of intensities, under 10%, with acceptable results. Nonetheless it spends too much of time for re-computing large amount of correlations, and without adjusting average intensity of each image it would cause regional average intensity not equal. Each time, intensity change and then re-computing next correlation would possibly influence the result of registration.

To overcome the above-mentioned problem, inventor selected to compute the relative positions of the six images as discussed before. Then compute the average intensity of each image and all of the six images, revise each average intensity to the same level. At last we applied multi-band blending to make the results more acceptable.

With reference to FIG. 11A, FIG. 11B and FIG. 12, which illustrate a schematic view of two adjacent regions, a schematic view of a distance map of the two adjacent regions and a schematic view of sequential stages of combining two images. After two images which have the highest correlation of the six ones have been found, the distance map will be calculated. In FIG. 11A, the black and white regions stand for the two images which are adjacency. FIG. 11B presents the distance map from the border between the two images. The distance map could be calculated by Euclidian Distance or for simplification, we set the first white pixel which is next to the black pixel as 1, and beside 1 we set it as 2, and so forth. Then as the pixel that numbered as 1, we multiplied its intensity a ratio S mentioned before. And as by use of Equation (1-6), we can make the intensity look smooth as the results. To modify the results better, we also add a parameter alpha to adjust the ratio S as S'=S*alpha. With or without alpha, linear compensation by using the distance map can yield good results.

For eliminating the difference of the images with their average intensities. The mean of each image is $$\bar{I}_k = \frac{\sum_{i=1}^{m} \sum_{j=1}^{n} I_k(i,j)}{m \times n} \quad k = 1 \ldots 6 \tag{1-8}$$

And the mean of all input images can be computed by $$\bar{I} = \frac{\sum_{k=1}^{6} \sum_{i_k=1}^{m_k} \sum_{j_k=1}^{n_k} I_k(i_k, j_k)}{\sum_{k=1}^{6} m_k \times n_k} \tag{1-9}$$

We adjust the intensity of each input image as $$I'_k(i,j) = I_k(i,j) \times \frac{\bar{I}}{\bar{I}_k} \quad k = 1 \ldots 6 \tag{1-10}$$

With several tries we choose not to ignore the background nor to consider the overlap as special cases because of two reasons: first, ignoring the background or considering the overlaps would not give a good result in these cases; second, with or without ignoring the background or considering the overlaps would not affect the ratio of compensation too much. Even the two ratios would not differ a lot, inventor choose Equations (1-7)~(1-10) since inventor intend to have better results.

Figure 13:
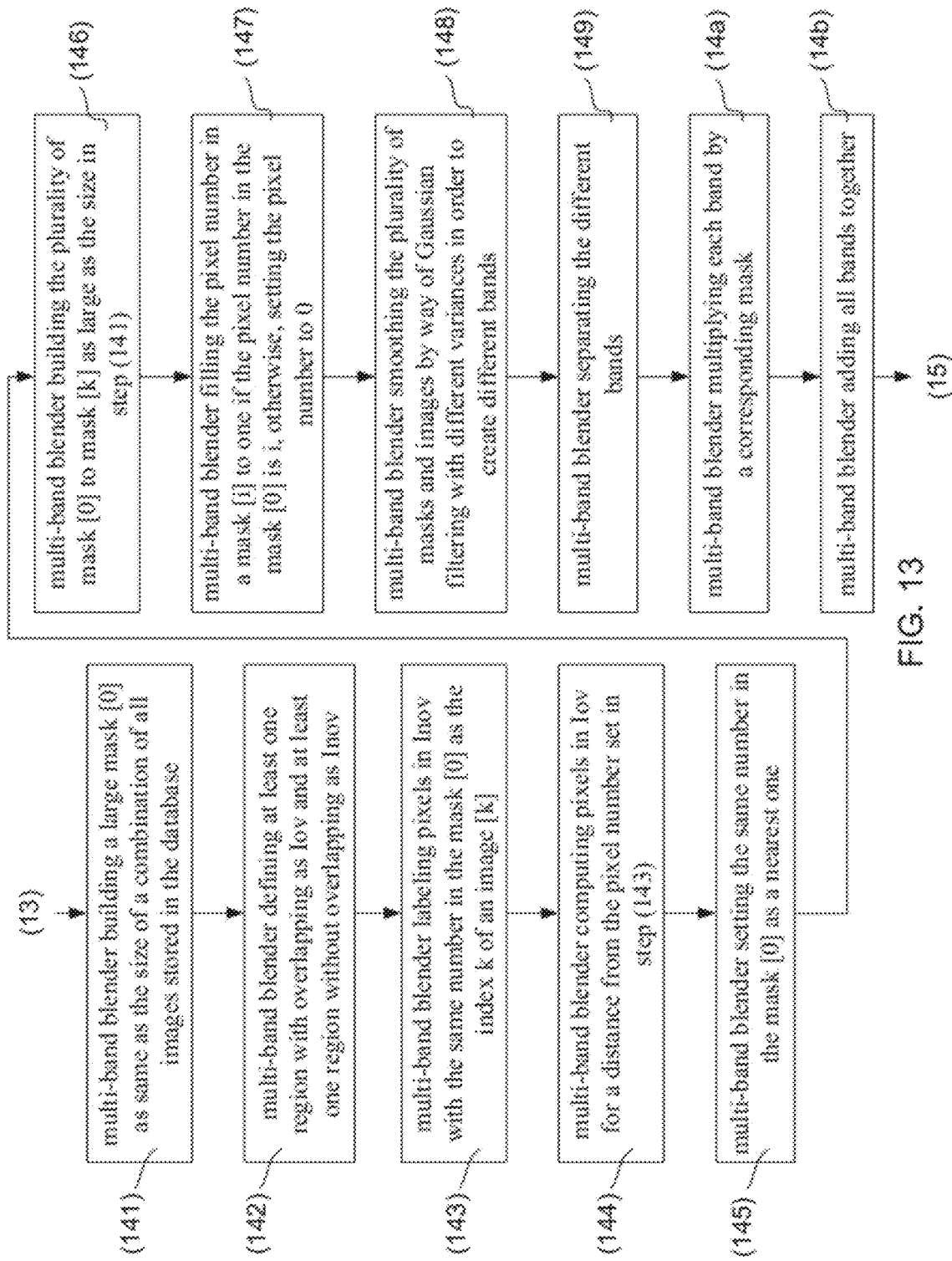
FIG. 13 illustrates detail of step (14) according to an embodiment of the present invention.

With reference to FIG. 13, illustrates detail of step (14) according to an embodiment of the present invention. The step (14) further includes the steps of:

(141) a multi-band blender building a large mask [0] as same as the size of a combination of all images stored in the database;

(142) the multi-band blender defining at least one region with overlapping as $I^{ov}$ and at least one region without overlapping as $I^{nov}$;

(143) the multi-band blender labeling pixels in $I^{nov}$ with the same number in the mask [0] as the index k of an image [k];

(144) the multi-band blender computing pixels in $I^{ov}$ for a distance from the pixel number set in step (143);

(145) the multi-band blender setting the same number in the mask [0] as a nearest one;

(146) the multi-band blender building the plurality of mask [0] to mask [k] as large as the size in step (141);

(147) the multi-band blender filling the pixel number in a mask [i] to one if the pixel number in the mask [0] is i, otherwise, setting the pixel number to 0;

(148) the multi-band blender smoothing the plurality of masks and images by way of Gaussian filtering with different variances in order to create different bands;

(149) the multi-band blender separating the different bands;

(14a) the multi-band blender multiplying each band by a corresponding mask; and (14b) the multi-band blender adding all bands together.

Step (141) to step (14b) are the steps of multi-band blending. Ideally each sample (pixel) along a ray would have the same intensity in every image that it intersects, but in reality this is not the case. Even after gaining compensation some image seams are still visible. Because of this, a good blending strategy is important.

A simple approach to blending is to perform a weighted sum of the image intensities along each ray using weight functions. However, this approach can cause blurring of high frequency detail if there are small registration errors. To prevent this we use the multi-band blending algorithm of Burt and Adelson. The idea behind multi-band blending is to blend low frequencies over a large spatial range and high frequencies over a short range.

By applying these steps, the gradient of intensities is smoother and the seam between six images is not visible.

Figure 14A:
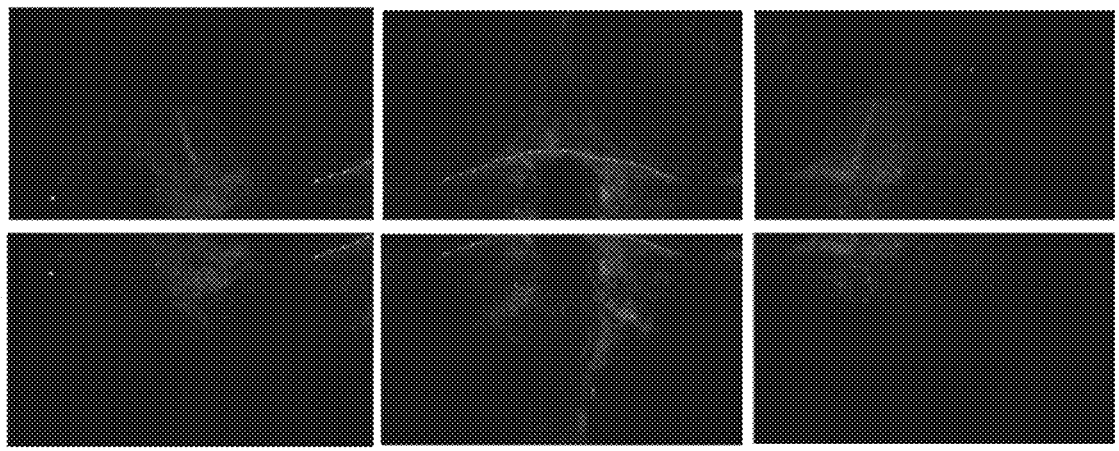
FIG. 14A and FIG. 14B illustrate a view of six input microscopy images and a result view of applying SIFT on the six input microscopy images.
Figure 14B:
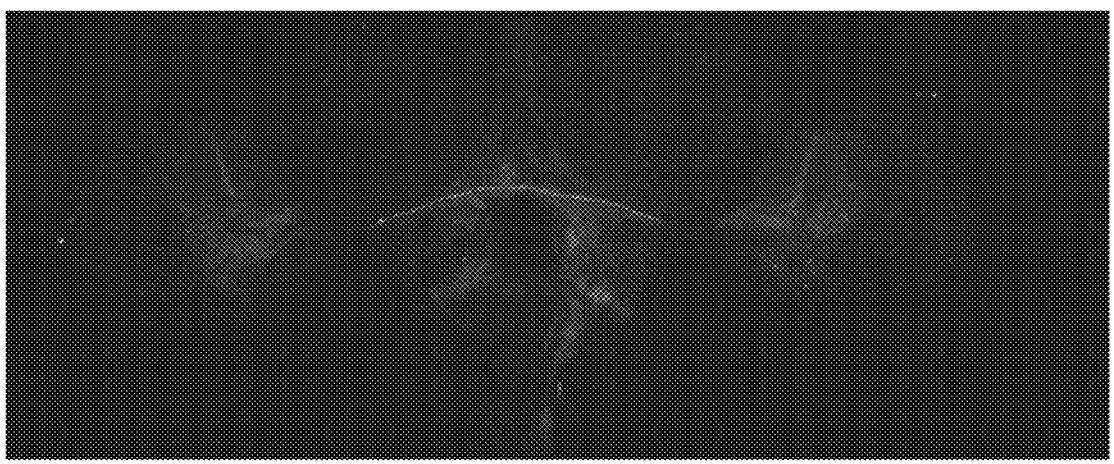
Figure 15:
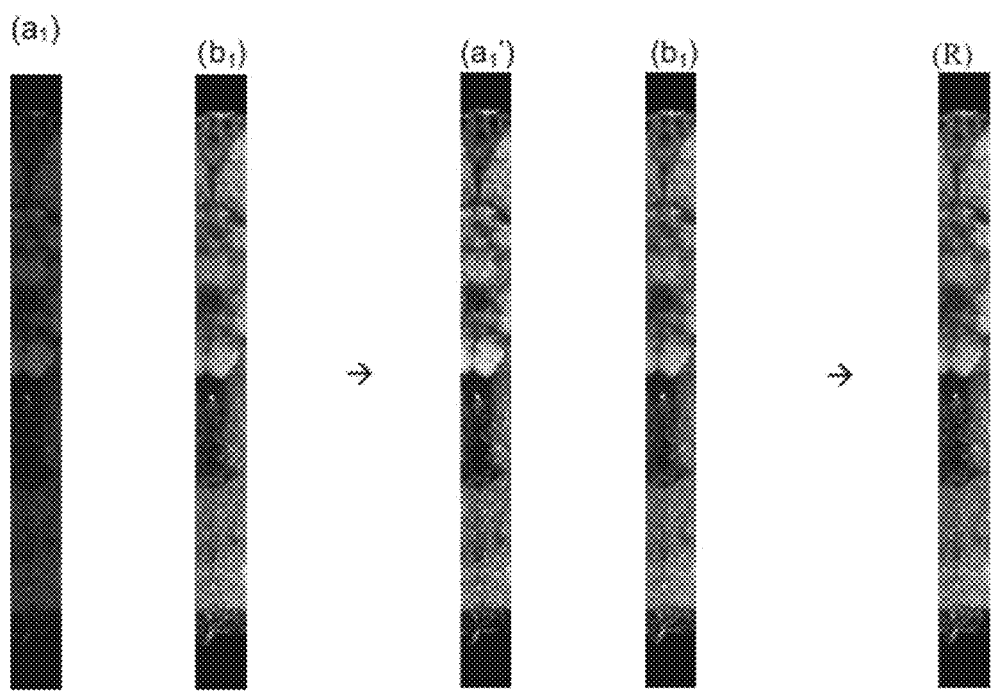
FIG. 15 illustrates a result view of a process of applying dynamic programming.
Figure 16A:
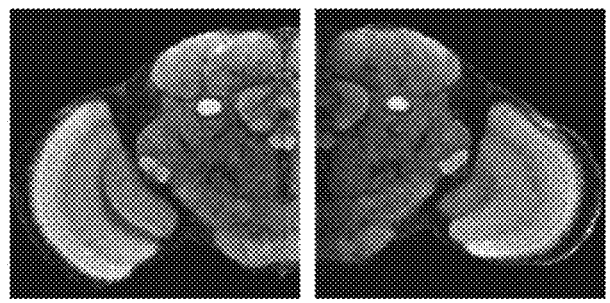
FIG. 16A and FIG. 16B illustrate a view of two input microscopy images and a result view of a combination of applying Equation (1-7) on the two input microscopy images.
Figure 16B:
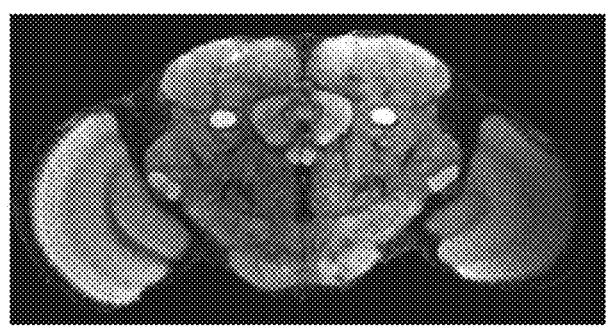
Figure 19A:
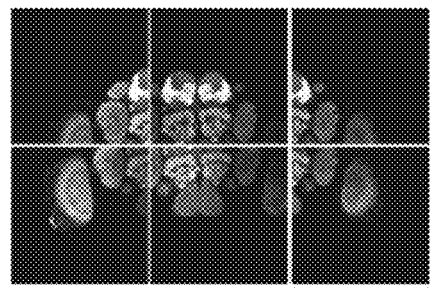
FIG. 19A and FIG. 19B illustrate a view of six input microscopy images and a result view of a combination of applying linear adjustment by distance map on the six input microscopy images.
Figure 19B:
Figure 20A:
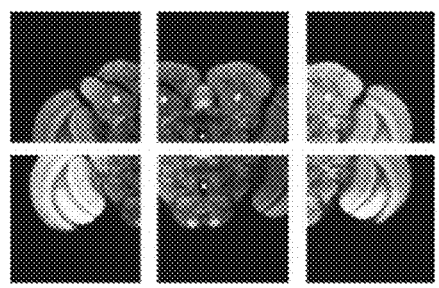
FIG. 20A, FIG. 20B and FIG. 20C illustrate a view of six input microscopy images, a view of the six input microscopy images after gain compensation and a result view of a combination of applying multi-band blending on the six input microscopy images
Figure 20B:
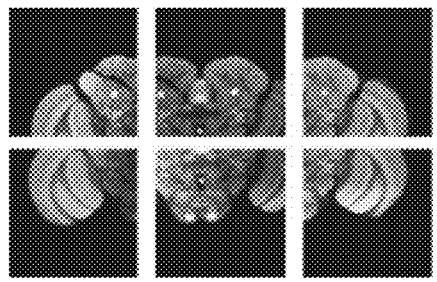
Figure 20C:
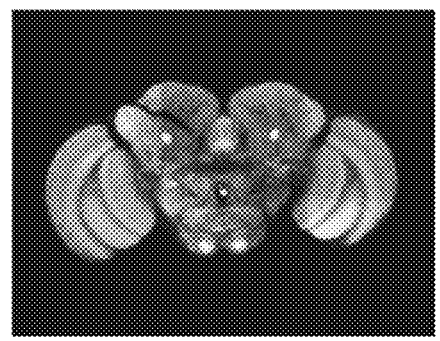

Following will be the results for SIFT, dynamic programming, combining two images, and combining a plurality of images. With reference to FIG. 14A and FIG. 14B, which illustrate a view of six input microscopy images and a result view of applying SIFT on the six input microscopy images. With reference to FIG. 15, which illustrates a result view of a process of applying dynamic programming, wherein bar $a_1$ is one of the regions of overlaps, bar $b_1$ is the other one of the regions of overlaps, bar $a_1'$ is bar $a_1$ after applying Equation (1-5), and bar R is the result of applying dynamic programming on bar $a_1'$ and $b_1$. Referring to FIG. 16A and FIG. 16B, which illustrate a view of two input microscopy images and a result view of a combination of applying Equation (1-7) on the two input microscopy images. Referring to FIG. 17A and FIG. 17B, which illustrate a view of two input microscopy images and a result view of a combination of applying Equation (1-6) on the two input microscopy images. Referring to FIG. 18A and FIG. 18B, which illustrate a view of six input microscopy images and a result view of a combination of applying linear adjustment by distance map on the six input microscopy images. Referring to FIG. 19A and FIG. 19B, which illustrate a view of six input microscopy images and a result view of a combination of applying linear adjustment by distance map on the six input microscopy images. Referring to FIG. 20A, FIG. 20B and FIG. 20C, which illustrate a view of six input microscopy images, a view of the six input microscopy images after gain compensation and a result view of a combination of applying multi-band blending on the six input microscopy images.

In the work of image registration by pyramidal correlation, it can find a good result for two images and also for multi-images. Then with adjacency adjustment, the result of combination image we found is more close to the same plane in the real world. And dynamic programming produces a good effect for eliminating the seam. Otherwise, SIFT is a powerful method in mosaic, but need more complicated parameter setting.

Figure 21:
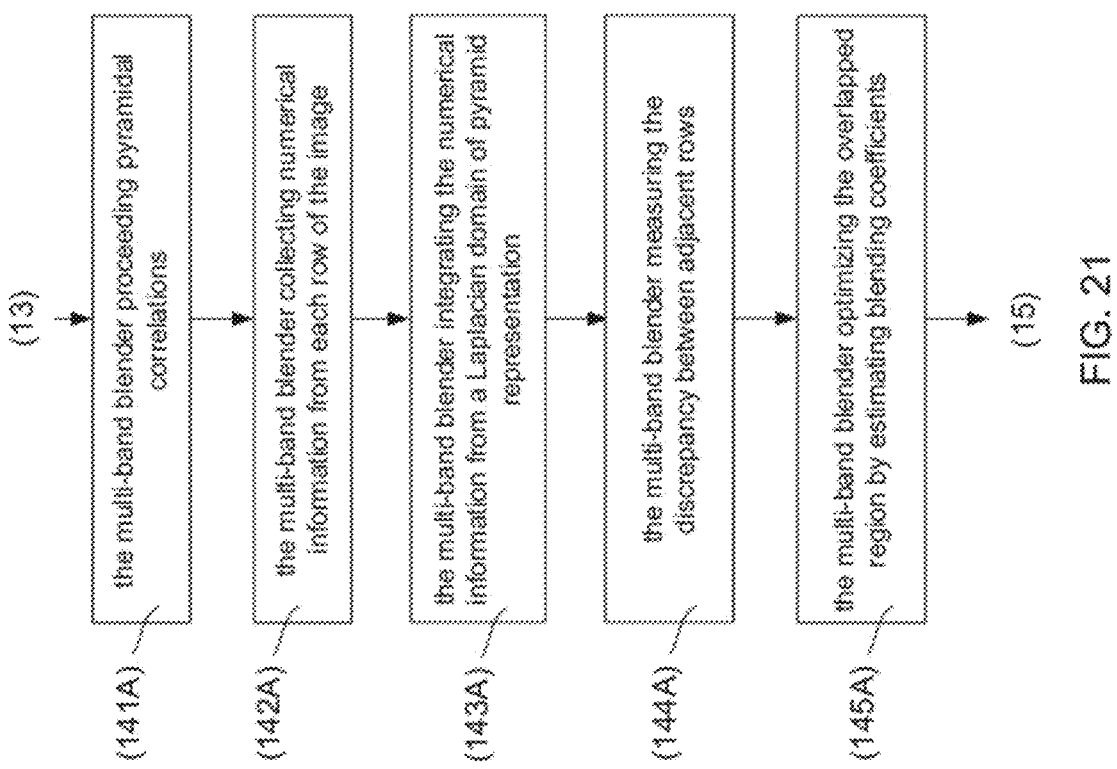
FIG. 21 illustrates detail of step (14) according to another embodiment of the present invention

With reference to FIG. 21, illustrates detail of step (14) according to another embodiment of the present invention. The step (14) which can also include the steps of:

(141A) the multi-band blender proceeding pyramidal correlations;
(142A) the multi-band blender collecting numerical information from each row of a Laplacian image;
(143A) the multi-band blender integrating the numerical information from a Laplacian domain of pyramid representation;
(144A) the multi-band blender measuring the discrepancy between adjacent rows; and
(145A) the multi-band blender optimizing the overlapped region by estimating the best blending coefficients.

In the step (141A) to step (143A), the approach is formulated as a multi-resolution parameter estimation problem and an optimal parameter estimation procedure is proposed to derive an array of blending vectors M. The vectors are used to compute the weighted average of two overlapping images on subbands of the image's pyramid representation. For an earlier-acquired image I and a later-acquired image J, the blending procedure can be formulated as minimizing the function defined by equation (1-11):

$$\min_M T_{blend}(M | I, J) + \mu T_M(M) \quad (1-11)$$

where $T_{blend}$ and $T_M$ are the blending function term and the regularization term, respectively, and the weighting $\mu$ balances the relative importance of the two terms; $T_{blend}(M|I,J)$ denotes the cost of using M to blend images I and J; and, $T_M(M)$ measures the penalty of M. The function $T_{blend}$ requires that the combined image should be smooth and it retains as much of the original information as possible. Specifically, it requires that the overlapping region is smooth and the blending process does not affect the truthfulness of the area. Because adjacent rows of to-be-combined images tend to have similar image structures, the function $T_M$ requires that the blending coefficients in adjacent rows are similar to each other.

The information in the overlapping regions of a pair of to-be-combined images is asymmetric; therefore, inventor has to find the optimal blending vectors as well as a suitable blending position to satisfy the aforementioned requirement.

A. Selecting the Blending Position

In fluorescence microscope imagery, the later-acquired image contains less trustworthy overlap information than the earlier-acquired image; thus, the blending position should be selected so that the information in the earlier-acquired image is affected as little as possible by the blending process. Meanwhile, the weighting coefficients used to blend two overlapping images should be content-dependent so that the values of the pixels in the transition zone can be evaluated according to the relative importance of two overlapping regions. However, because the complexity of deriving the blending coefficient for each pixel would be high, we simplify the procedure by assuming that all the pixels in a row are blended by the same vector.

Figure 22:
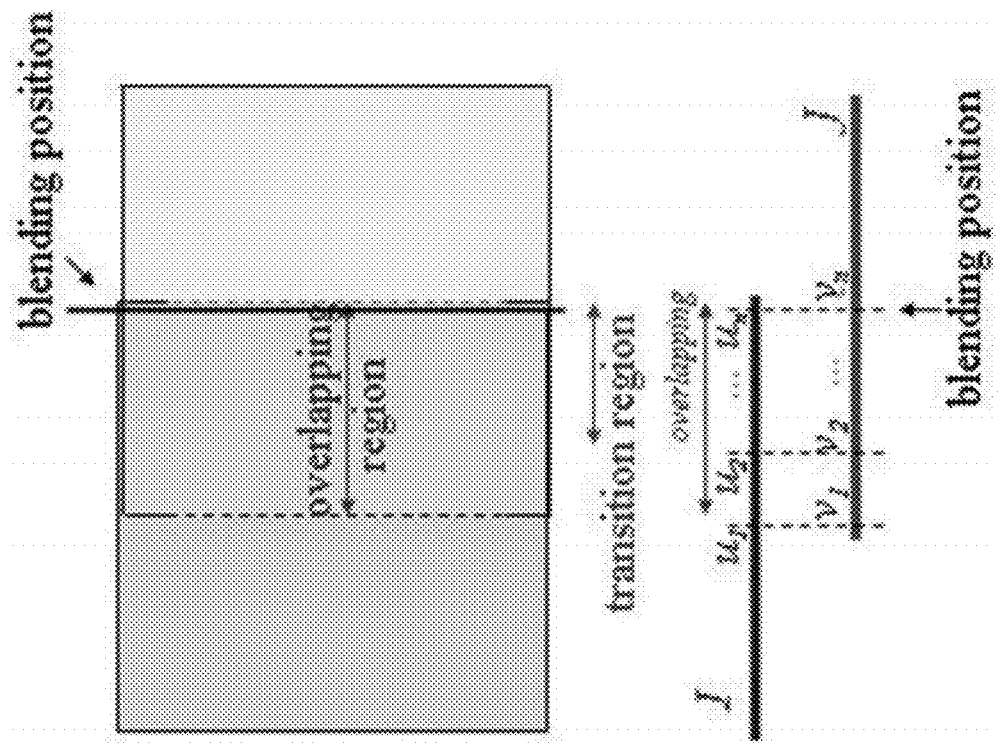
FIG. 22 illustrates the relationship between the blending position, the overlapping regions, and the transition region, which is the area where pixels are affected by the blending process

With reference to FIG. 22, illustrates the relationship between the blending position, the overlapping regions, and the transition region, which is the area where pixels are affected by the blending process. Let $u_1, u_2, \ldots, u_n$ be the pixels in the overlapping region of the earlier-acquired image I, and let $v_1, v_2, \ldots, v_n$ be the corresponding pixels in the later-acquired image J. When we blend confocal microscope images, the objective is to retain as much information as possible in the overlapping area of the earlier-acquired image I; thus, we select the blending position that aligns with the right boundary of I. Then, inventor can formulate equation (1-11) precisely and estimate the blending parameters by the following optimization approach.

B. Estimating Optimal Blending Parameters

Next, describe the blending function $T_{blend}$, the penalty function $T_M$, and the proposed constrained quadratic optimization algorithm used to estimate the blending parameters that solve equation (1-11) optimally.

$$T_{blend}(M|I,J) = \|[I|^M J] - [I|J]\|_F^2 + \lambda \|\nabla_h [I|^M J]\|_F^2 \quad (1-12)$$

Where $[I|^M J]$ denotes a 2-D matrix whose entries are the pixel values of the mosaiced image obtained by combining images I and J with the blending vectors M; and [I|J] denotes the matrix of the directly mosaiced image obtained by overlaying I on J without blending (i.e., the intensities of the pixels in the overlapping region of the directly mosaiced image are copied from the corresponding region of the earlier-acquired image I). Moreover, $\|[I|^M J] - [I|J]\|_F^2$ calculates the square of the Frobenius norm of the difference between the matrix of the blended image and that of the directly mosaiced image.

Here, $\|\nabla_h [I|^M J]\|_F^2$ measures the smoothness of the blended image over the overlapping region of the two images; $\nabla_h$ is the first-order difference of adjacent pixels in a row; and the parameter $\lambda$ balances the importance of the integrity and smoothness terms.

Figure 23:
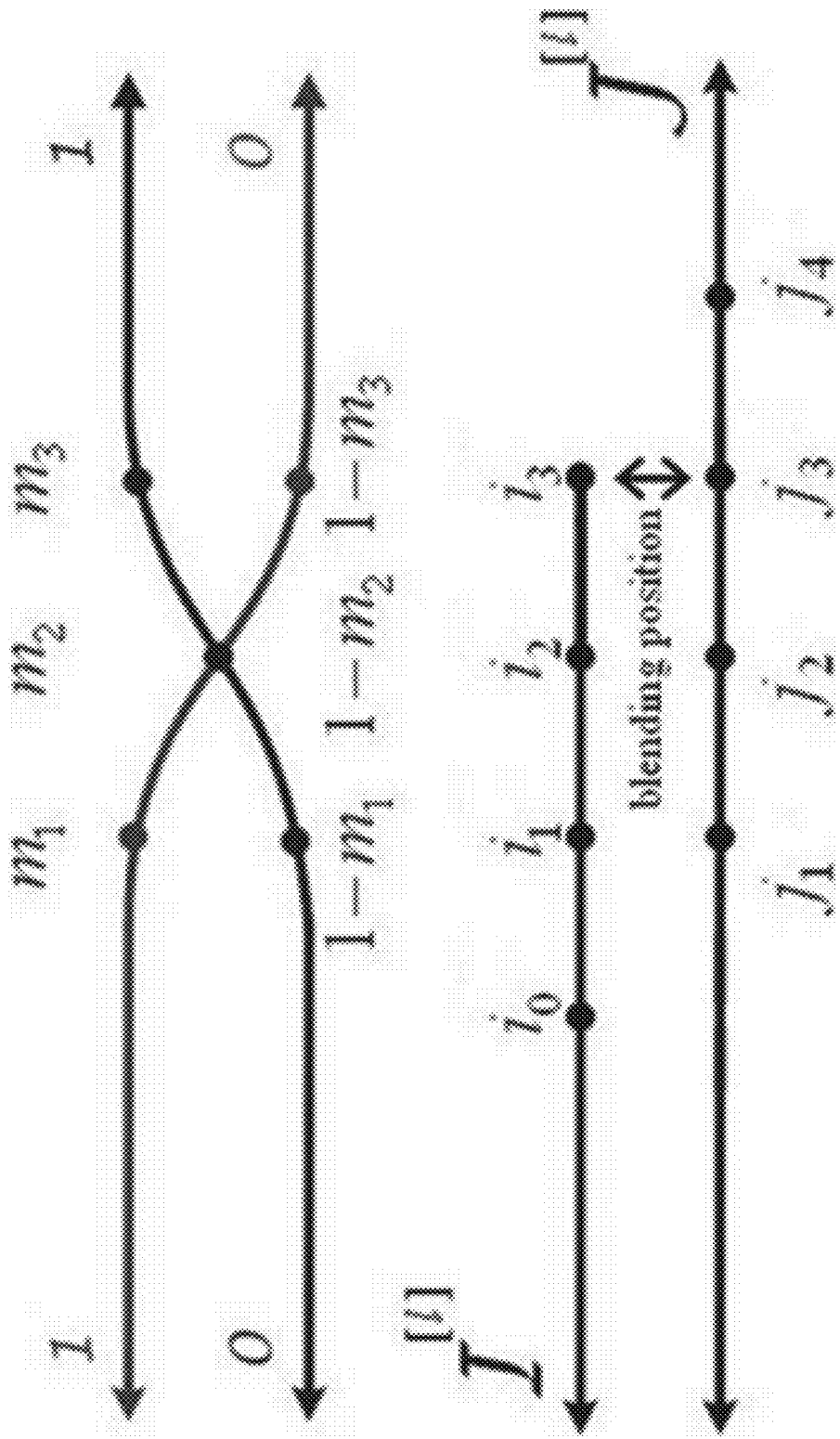
FIG. 23 illustrates two rows of the blended image are blended; blending coefficients are $[m_1\ m_2\ m_3]^T$. The coefficient for the top line are $m_1, m_2, m_3$, and those for the bottom line are $1-M_1$, $1-M_2$ and $1-M_3$; $I^{[l]}$ and $J^{[l]}$ denote the lth-level Laplacian images of I and J, respectively.

The proposed blending process is applied on a Laplacian pyramid domain. Let us decompose each of the two to-be-combined images into N levels. Because the images I and J are already registered, we can assume that they are combined row by row. Thus, different rows may yield different blending parameters.

a) Blending a Row:

For simplicity, assume that the blending coefficients in the same row in different Laplacian pyramid levels are the same. Without loss of generality, we use a blending vector of length 3: $[m_1{}' m_2{}' m_3{}']$ for row r, where the superscript T denotes the matrix transpose. Let the pixels in the blending zone of this row at the coarsest level, i.e., the Nth level, of the Laplacian pyramids of images I and J be $i_1, i_2, i_3$ and $j_1, j_2, j_3$, respectively. The two rows are blended to obtain $m^r_k I(r, i_k)+(1-m^r_k) J(r, i_k)$, with k=1, 2, 3, in row r of the coarsest level of the blended image, as shown in FIG. 23. Note that the intersection of pixels i, and j, is chosen as the blending position. The mosaic result of the Nth-level Laplacian subband of this row can be represented by equation (1-13)

$$L_{N,r} = \begin{bmatrix} \overline{I^{[N]}(i)} \\ m_1^r I^{[N]}(i_1) + (1 - m_1^r)J^{[N]}(j_1) \\ m_2^r I^{[N]}(i_2) + (1 - m_2^r)J^{[N]}(j_2) \\ m_3^r I^{[N]}(i_3) + (1 - m_3^r)J^{[N]}(j_3) \\ \overline{J^{[N]}(j)} \end{bmatrix} \quad (1\text{-}13)$$

$$= \begin{bmatrix} \overline{0} & \overline{0} & \overline{0} \\ I^{[N]}(i_1) - J^{[N]}(j_1) & 0 & 0 \\ 0 & I^{[N]}(i_2) - J^{[N]}(j_2) & 0 \\ 0 & 0 & I^{[N]}(i_3) - J^{[N]}(j_3) \\ \overline{0} & \overline{0} & \overline{0} \end{bmatrix} \begin{bmatrix} m_1^r \\ m_2^r \\ m_3^r \end{bmatrix} + \begin{bmatrix} \overline{I^{[N]}(i)} \\ J^{[N]}(j_1) \\ J^{[N]}(j_2) \\ J^{[N]}(j_3) \\ \overline{J^{[N]}(j)} \end{bmatrix}$$

$$= A_N m^r + C_N$$

Where $\overline{I^{[N]}(i)}$ and $\overline{J^{[N]}(j)}$ denote, respectively, the pixels not affected by blending the Nth-level I and J Laplacian images; and $\overline{0}$ denotes a sequence of zeros of an appropriate length. The mosaiced Laplacian subbands of this row at other levels can be derived in the same way.

The width of the transition area depends on the number of pyramid decompositions N and the length of the filter l, used to construct the pyramid. Let v be the length of the blending vector. Then, the width of the transition region, $W_{trans}$, can be calculated as follow equation (1-14)

$$W_{trans}(N) = 2W_{trans}(N-1) + l - 2, \text{ with } W_{trans}(0) = v \quad (1\text{-}14)$$

Generally speaking, a wider transition area yields a smoother blending result, but it preserves less original information. The approach that sets the blending position on the boundary of I yields a smooth blended image that preserves as much information as possible in the earlier-acquired image I.

Figure 24:
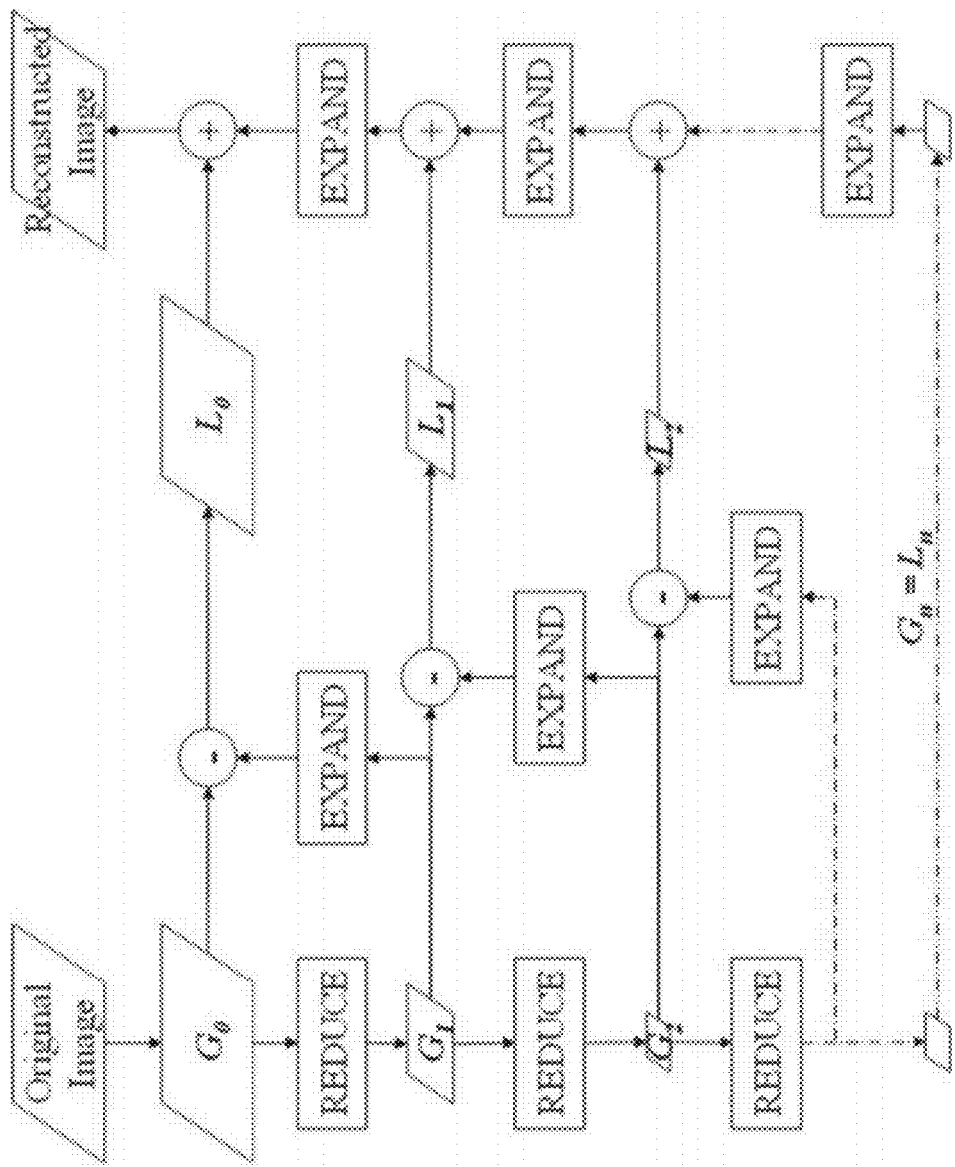
FIG. 24 illustrate the Image pyramid structure.

As shown in FIG. 24, which illustrate the Image pyramid structure. The Gaussian pyramid at the (N−1)th level of the combined image can be obtained by performing an expand operation on $L_{N,R}$ and adding the result to $L_{N-1,r}$. Let $U_k$ and $W_k$ denote, respectively, the upsampling kernel and the low-pass kernel at the kth level. To obtain the combined image at the (N−1)th level of the Gaussian pyramid, the expand operation upsamples $L_{N,R}$ by applying $U_N$ and smoothes the result by applying $W_N$, which yields the follow equation (1-15)

$$G_{N-1,r} = L_{N-1,r} + W_N U_N L_{N,R} \quad (1\text{-}15)$$
$$= (A_{N-1} + W_N U_N A_N)m^r + (C_{N-1} + W_N U_N C_N)$$

Based on the aforementioned procedure, the mosaic result at the finest resolution of the Gaussian pyramid can be derived by equation (1-16)

$$G_{0,r} = A^r m^r + C^r \quad (1\text{-}16)$$

where $$A^r = A_1 + \sum_{j=2}^{N} \left( \prod_{i=2}^{j} W_i U_i \right) A_j \quad (1\text{-}161)$$

and $$C^r = C_1 + \sum_{j=2}^{N} \left( \prod_{i=2}^{j} W_i U_i \right) C_j \quad (1\text{-}162)$$

Let $[I|J]^r$ denote the signal obtained by combining the rth rows of images I and J directly. According to equation (1-12), the cost of blending row r with vector $m^r$ is derived by equation (1-17)

$$\|(A^r m^r + C^r) - [I|J]^r\|_2^2 + \lambda \|D(A^r m^r + C^r)\|_2^2 \quad (1\text{-}17)$$

where D is the kernel matrix of the first-order difference along the direction of the column. And let $$P^r = [I|J]^r - C^r$$

then the equation (1-17) can now be rewritten as equation (1-17S)

$$\|A^r M^r - P^r\|_2^2 + \lambda \|D(A^r m^r + C^r)\|_2^2 \quad (1\text{-}17S)$$

Note that the Frobenius norm of a 1-D vector is identical to the vector's two-norm.

b) Blending All the Rows in the Overlapping Region:

Before describing how an image pair is mosaiced by blending all K rows in the overlapping area, we define the following symbols:

$$A = \begin{bmatrix} A^1 & 0 & \cdots & 0 \\ 0 & A^2 & \cdots & 0 \\ \vdots & & \ddots & \\ 0 & 0 & \cdots & A^K \end{bmatrix}$$

$$DA = \begin{bmatrix} DA^1 & 0 & \cdots & 0 \\ 0 & DA^2 & \cdots & 0 \\ \vdots & & \ddots & \\ 0 & 0 & & DA^K \end{bmatrix}$$

$$P = [P^1 \quad P^2 \quad \cdots \quad P^K]^T$$
$$C = [C^1 \quad C^2 \quad \cdots \quad C^K]^T$$
$$DC = [DC^1 \quad DC^2 \quad \cdots \quad DC^K]^T$$

where the definitions of $A^k$, $C^k$, and $P^k$ are the same as in equation (1-161) and (1-162), and the superscript k denotes the row index; D is the kernel matrix of the first-order difference along the direction of the column; and the superscript T denotes a transpose operation.

The block diagonal matrices A and DA are introduced to extend the formulation of blending a row to blending sets of rows. Accordingly, the blending function for mosaicing the overlapping region can be written as follow equation (1-18):

$$T_{blend}(M \mid I, J) = \|[I \mid^M J] - [I \mid J]\|_F^2 + \lambda \|\nabla [I \mid^M J]\|_F^2 \quad (1\text{-}18)$$
$$= \|AM - P\|_2^2 + \lambda \|DAM + DC\|_2^2$$

where M is the vector formed by cascading the blending vector of each row. The vector is defined as $$M = [m_1^1\ m_2^1\ m_3^1 \ldots m_1^K\ m_2^K\ m_3^K]^T \quad (1\text{-}181)$$

2) Penalty Function of the Blending Vector: Because adjacent rows of images tend to have similar structures and intensities, the function $T_M$ measures the discrepancy between the blending coefficients in adjacent rows. Let $$M = \begin{bmatrix} m_1^1 & m_1^2 & \ldots & m_1^K \\ m_2^1 & m_2^2 & \ldots & m_2^K \\ m_3^1 & m_3^2 & \ldots & m_3^K \end{bmatrix}^T \quad (1\text{-}191)$$

Note that $M = \text{vec}(M^T)$, where vec is the vector operator in matrix calculus. The penalty function can be defined as the sum of the squared differences of the blending vectors of two adjacent rows as equation (1-192)

$$T_M(M) = \|\nabla_y M\|_F^2 \quad (1\text{-}192)$$
$$= \sum_{j=1}^{K-1} \sum_{i=1}^{3} \left(m_i^{j+1} - m_i^j\right)^2$$

where $\nabla_y$ is the derivative along the direction of the column. The objective of the penalty is to ensure that the values of adjacent blending vectors are similar. Equation (1-192) can be rewritten as:

$$T_M(M) = \left\| \begin{bmatrix} -1 & 0 & 0 & 1 & 0 & 0 & \ldots \\ 0 & -1 & 0 & 0 & 1 & 0 & \ldots \\ 0 & 0 & -1 & 0 & 0 & 1 & \ldots \\ \vdots & & & & & & \ddots \\ \vdots & & & & & & & \ddots \end{bmatrix} M \right\|_F^2 = \|HM\|_2^2 \quad (1\text{-}193)$$

where HM is a vector and H is a Toeplitz matrix denoting the discrete convolution.

3) Solving the Optimal Blending Parameters: By combining the results of (1-18) and (1-193), the objective function in (1-11) of the blending procedure can be derived as follows:

$$T_{blend}(M,I,J) + \mu T_M(M) = \|AM - P\|_2^2 + \lambda \|(DAM + DC)\|_2^2 +$$
$$\mu \|HM\|_2^2 = M^T(A^TA + \lambda DA^TDA + \mu H^TH)M - 2$$
$$(P^TA - \lambda DC^TDA)M + P^TP + DC^TDC \quad (1\text{-}20)$$

By omitting the constant terms and letting $Q = A^TA + \lambda DA^TDA + \mu H^TH$ and $f^T = -(P^TA - \lambda DC^TDA)$ the objective function becomes the following quadratic programming problem:

$$\min_M T_{blend}(M \mid I, J) + \mu T_M(M) = \min_M \frac{1}{2}M^TQM + f^TM \quad (1\text{-}21)$$

Recall that because of the photobleaching of microscope images, the overlapping region of the earlier-acquired image is more informative than that of the later-acquired image. To preserve as many Laplacian coefficients as possible during the blending of the earlier-acquired image, we require that the blending coefficients for that image should be larger than those for the later-acquired image. The requirement corresponds to the constraint that each element in M is not less than $M_{min}$, whose value is set at 0.5 in our experiments. The present invention also require that the intensity of the mosaic image is upper bounded, which corresponds to the constraint that each element in M is not larger than $M_{max}$, whose value is set at 1 in our experiments. The coefficients of the mosaic image form a convex combination of the corresponding coefficients in the earlier- and later-acquired images. This can also be formulated easily as a linear constraint and incorporated into our framework.

In the combination of two images, inventor takes overlaps as most important parts of intensity decay. So all of our efforts are focused on the regions of overlaps and the regions near them, and inventor got acceptable results. But in the case of combination of multi-images, the monolithic appearance became more important. Therefore inventor tried different methods to complete adjustments such as linear adjustment by distance map, gain compensation and multi-band blending. Multi-band blending method keeps more high-frequency details of the images.

Figure 25:
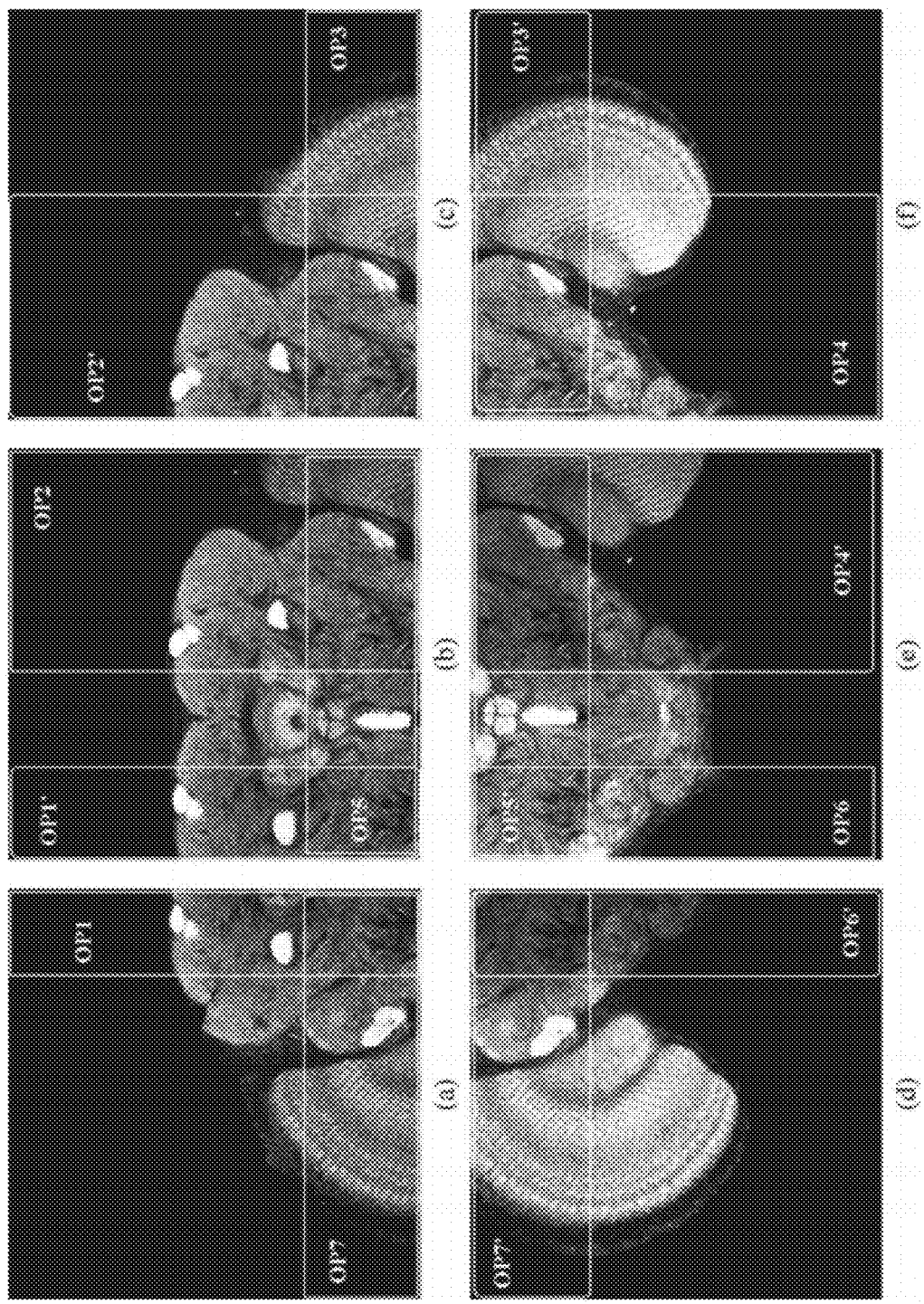
FIG. 25 illustrate a sequence of six images taken from fluorescent confocal microscope images of a Drosophila's brain.

FIG. 25 shows a sequence of six images taken from fluorescent confocal microscope images of a Drosophila's brain. The images were captured in a clockwise direction, starting from the top left-hand image. Although some images overlap with one or more other images, the present invention only combined two images at a time. The pairs (OPi,OPi') with i=1, . . . , 7 are the overlapping areas of the images. The image containing OPi was taken before that containing OPi'. In all cases, the intensity of OPi is larger than that of OPi' except in OP7 and OP7'. Biologists adjusted the intensity of the bottom left-hand image manually by multiplying a constant gain on the whole image. Since the bottom left image has two overlapping areas, OP7' and OP6', it is very difficult to adjust the image correctly; hence, the later-acquired area OP7' appears to be lighter than OP7. This shows that compensating for intensity loss by adjusting the mean values is not a straightforward task. To obtain the whole mosaic image, the present invention mosaic the top images to form one image and do the same for the bottom images. Then, the two resulting images are combined. To obtain the top mosaic image, the present invention follows the blending line of images in FIG. 25(a) and (b) on the right-hand boundary of OP1' and the blending line of images in FIG. 25(b) and (c) on the right-hand boundary of OP2'. Similarly, to obtain the bottom mosaic image, the present invention follow the blending line of images in FIG. 25(d) and (e) on the left-hand boundary of OP6' and that of images in FIG. 25(e) and (f) on the left-hand boundary of OP4'. When the resulting top and bottom mosaic images are combined, the blending lines between the upper mosaiced and the lower mosaiced half images are on the bottom boundaries of OP7', OP5', and OP3', respectively.

Figure 26:
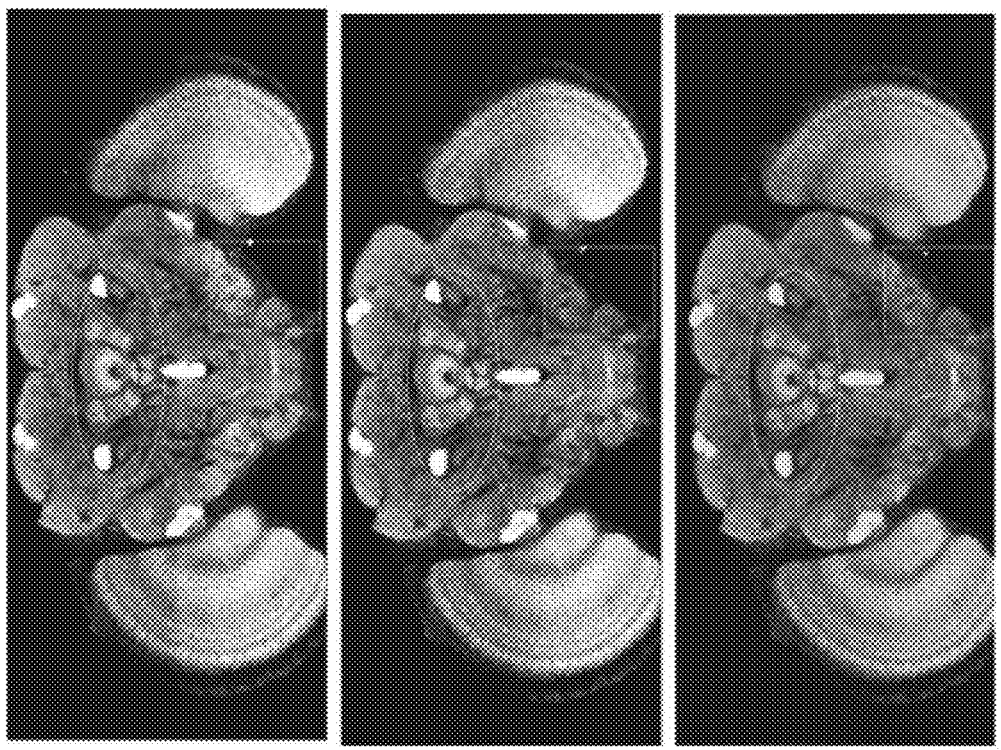
FIG. 26 compares the results of mosaicing the component images in FIG. 25 by the proposed method (top), Burt and Adelson's method (middle), and MosaicJ (bottom)
Figure 27:
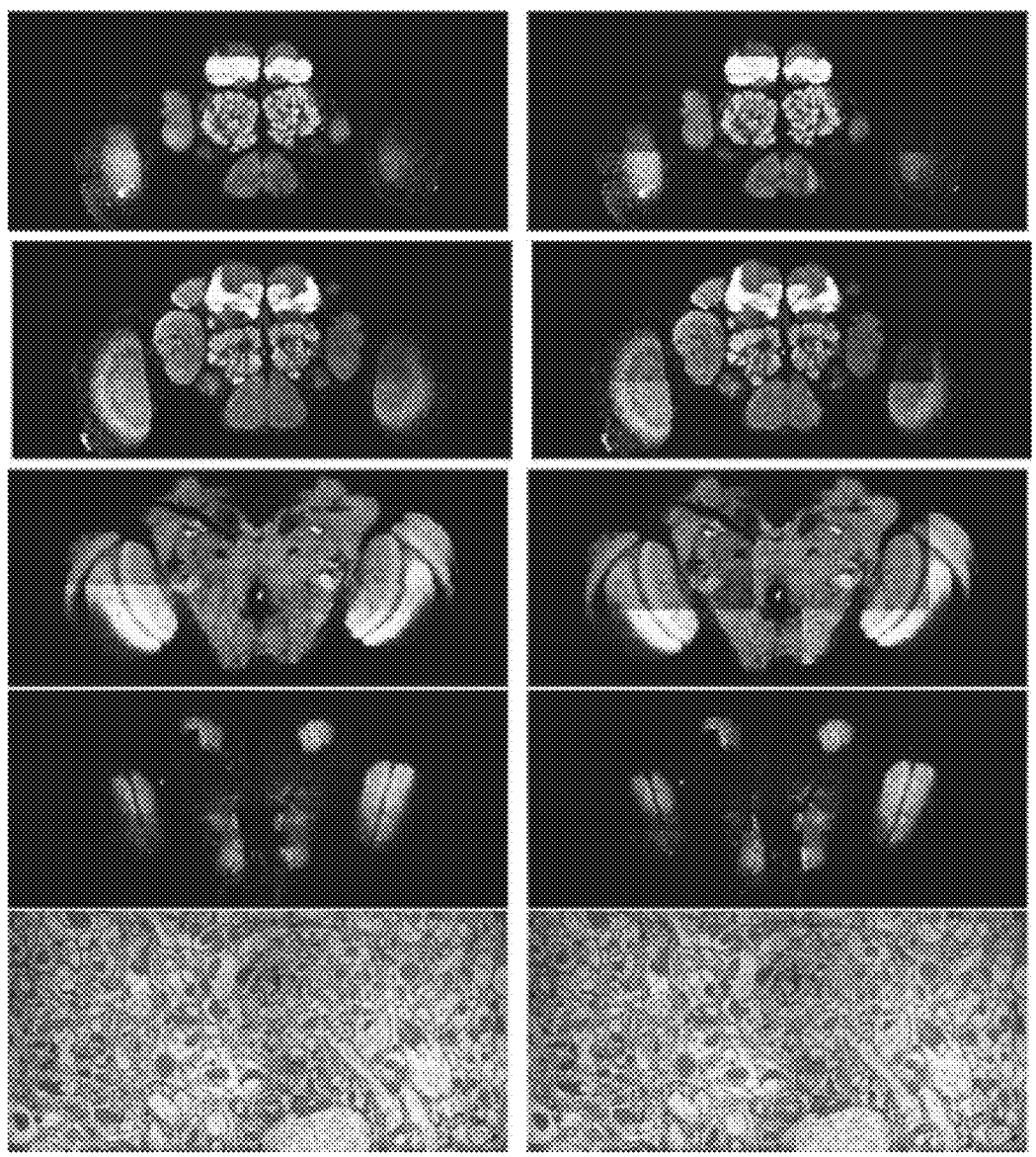
FIG. 27 illustrate some mosaicing results of Drosophila's brain images at different depths.

FIG. 26 compares the results of mosaicing the component images in FIG. 25 by the proposed method (top), Burt and Adelson's method (middle), and MosaicJ (bottom). The blending coefficients used to obtain the middle image are 0.25, 0.5, and 0.75. For example, let $i_1, i_2, i_3$ and $j_1, j_2, j_3$ be, respectively, the coefficients of the overlapping areas of two lines in the Ith-level Laplacian images. Then, the blended values are $0.75i_1+0.25j_1$, $0.5i_2+0.5j_2$, and $0.25i_3+0.75j_3$. In present invention, method yields better contrast as shown by the rectangular area in the overlapping regions; however, MosaicJ yields a smoother result, e.g., the ellipse region of the bottom image is more blurred than the regions in the other two images. Note that the blending process only affects the regions in the transition zone. Inventor observes that the three methods derive similar results in nonoverlapping regions. FIG. 27 shows some mosaicing results of Drosophila's brain images at different depths. Note that when inventor process the EM images, the present invention set $M_{max}=1$ and $M_{min}=0$ because they are equally informative.

Figure 28:
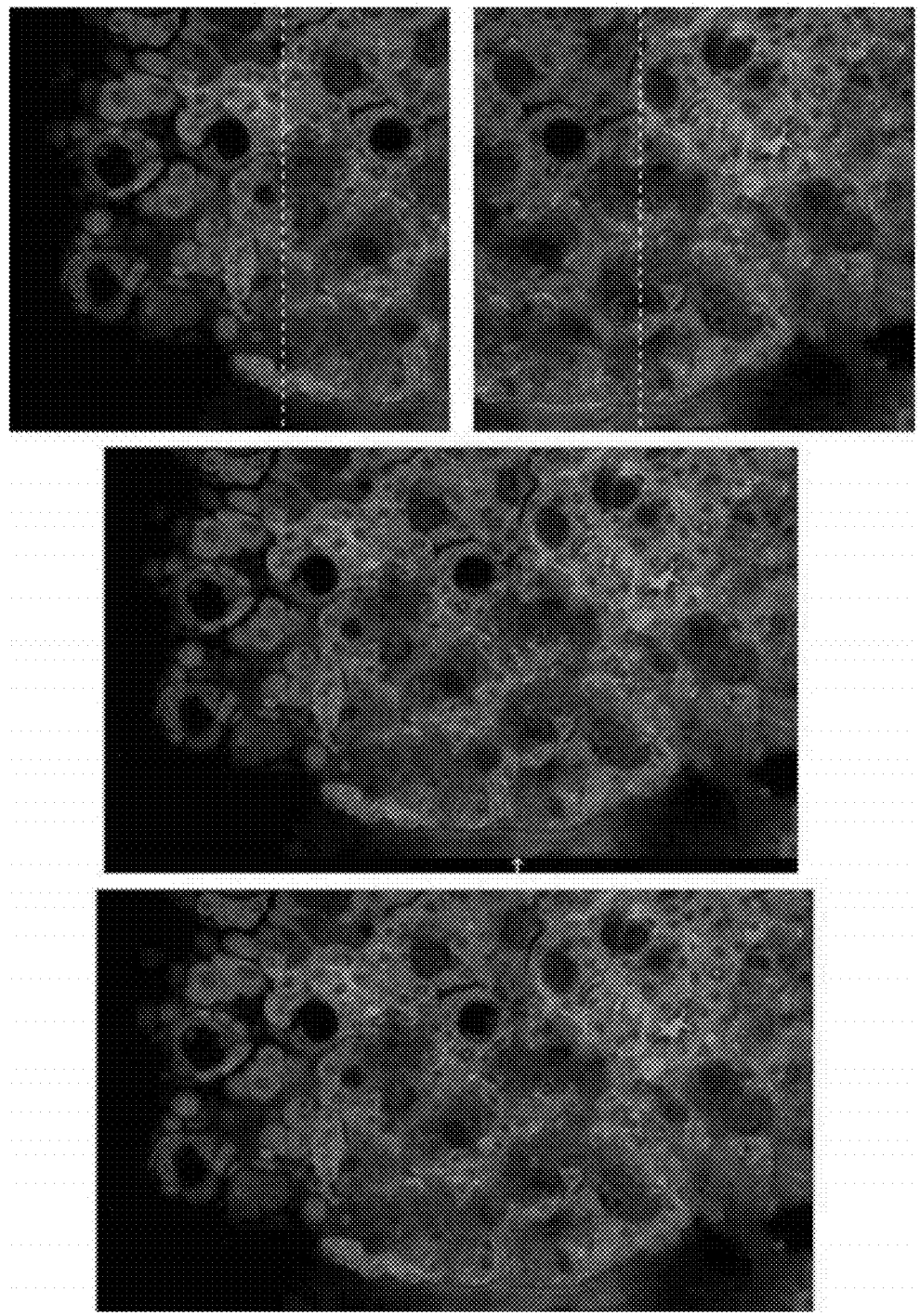
FIG. 28 illustrate the images to be combined, and the bottom image is our mosaic image.

The other set of data contains mouse pancreas images that were also acquired by a Zeiss LSM 510 confocal microscope under almost the same conditions as those described earlier. The top row in FIG. 28 shows the images to be combined, and the bottom image is our mosaic image. Since the right-hand image was acquired later, the blending position, indicated by the arrow in the middle image of FIG. 28, is selected near the right-hand boundary of the overlapping area of the top left image. These images only contain two channels: an R channel for nuclei and a G channel for other tissues. Due to possible vibrations, there was a misalignment in the slice depth when these two image stacks were acquired; thus, the size of the same tissues in the top left and top right images may look slightly different. In the present invention, algorithm mosaiced the R and G channels separately; that is, the blending vectors for the channels were estimated independently. For example, the optimized blending vectors of the 994th, 995th, and 996th rows for the R channel are $[0.9500\ 0.9500\ 0.9500]^T$, $[0.9500\ 0.9500\ 0.9500]^T$ and $[0.9472\ 0.9472\ 0.9472]^T$, respectively; and those for the G channel are $[0.4938\ 0.9500\ 0.5474]^T$, $[0.7322\ 0.9500\ 0.7464]^T$ and $[0.8691\ 0.9472\ 0.8672]^T$, respectively. Inventor observes that these two sets of blending coefficients vary gradually row by row due to the regularization term in (1-11). For regions that do not contain any nuclei, the corresponding blending coefficients for the R channel remain unchanged, but those for the G channel vary.

Figure 29:
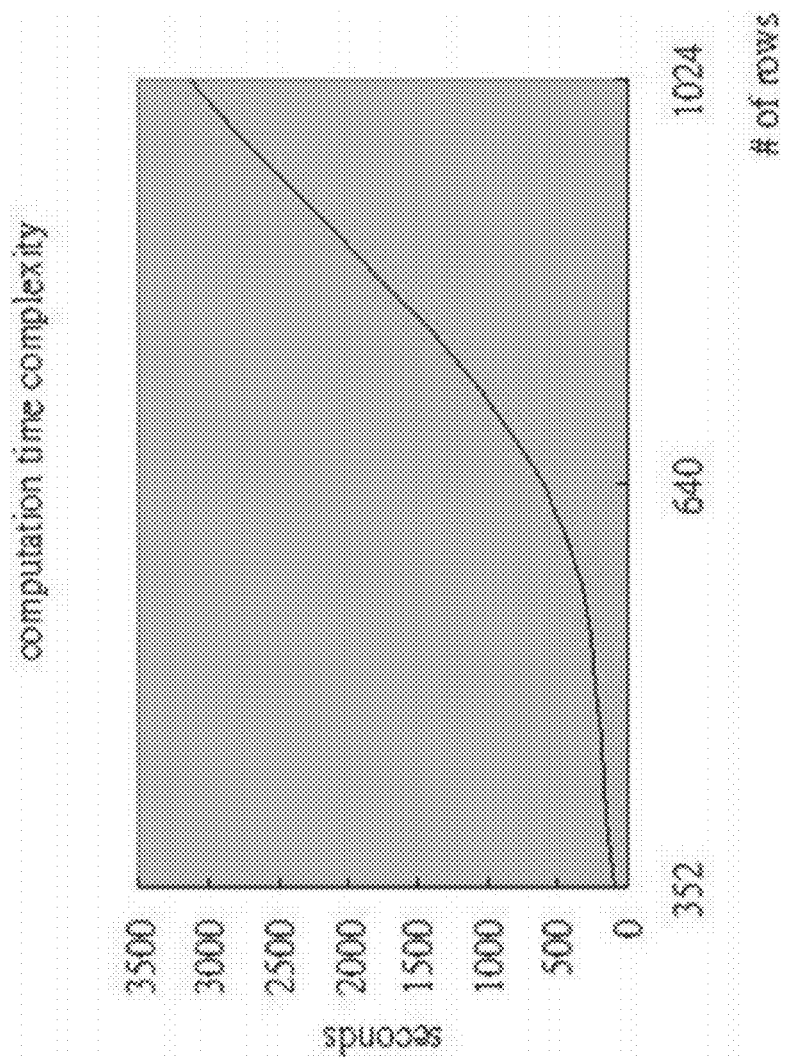
FIG. 29 illustrate the results derived from measuring the average computational time versus the number of rows.

Finally, applying algorithm on all the images according to present invention, inventor measured the average computational time versus the number of rows. The results are shown in FIG. 29. The data were processed on a Windows 7 server with an Intel i7 CPU (3.07 GHz) and 6 GB RAM; and the algorithm was implemented by MATLAB R2009a without parallel computing inventor observe that the average time required for mosaicing is almost constant when the number of rows is less than 640, but it increases thereafter. To reduce the average computation time, it's available either downsample the rows or partition the images. By downsampling the rows, images can be obtained with fewer rows. After deriving the optimal blending coefficients for the rows of the down-sampled images, it can interpolate the blending coefficients for rows that were not sampled in the downsampling process. By partitioning the images, several subimages with fewer rows can be obtained. The subimages are processed independently and their results are combined to obtain a final mosaic image.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for optimizing multiresolution blending of confocal microscope images comprising the steps of:
   (1) a main processor confirming the number of images stored in a database;
   (2) the main processor deciding whether the number of images stored in the database to be stitched are more than two, if no, going to step (3), otherwise, going to step (7);
   (3) a multiscale correlation estimator proceeding pyramidal correlations;
   (4) a local gain-compensator gaining compensation for the overlapped region of the two images;
   (5) an intensity adjuster proceeding an intensity adjustment beyond the overlapped regions;
   (6) a stitching-position finder proceeding a dynamic programming, then going to step (15);
   (7) the main processor deciding whether the pyramidal correlation is a must, if yes, going step (8), otherwise, going to step (12);
   (8) the multiscale correlation estimator proceeding the pyramidal correlations;
   (9) an adjacency adjustor proceeding an adjacency adjustment;
   (10) the main processor deciding whether a linear adjustment by a distance map is a must, if yes, going to step (11), otherwise, going to step (13);
   (11) the main processor proceeding the linear adjustment by the distance map;
   (12) the main processor proceeding an scale invariant feature transform (SIFT);
   (13) a global gain compensator executing a gain compensation for the all images;
   (14) a multi-band blender proceeding a multi-band blending; and
   (15) the main processor combining the images to form the confocal microscopy image.

2. The method for optimizing multiresolution blending of confocal microscope images according to claim 1, wherein step (3) further comprises the steps of:
   (31) the multiscale correlation estimator down-sampling the images stored in the database into a first smallest scale, which is the top level of a first pyramid;
   (32) the multiscale correlation estimator computing a first plurality of correlations with other images pixel by pixel;
   (33) the multiscale correlation estimator eliminating a first plurality of irrational results in order to gain a first highest correlation;
   (34) the multiscale correlation estimator acquiring a first relative position on a first upper-left corner of one of the images;
   (35) the multiscale correlation estimator up-sampling the images to the next first level;
   (36) the multiscale correlation estimator searching within a first reasonable range around the first relative position in order to refine the coordinates of the first corner; and
   (37) the multiscale correlation estimator determining whether the first relative position is found in the first finest level, if yes, going to step (4), otherwise, going to step (31).

3. The method for optimizing multiresolution blending of confocal microscope images according to claim 1, wherein step (4) further comprises the steps of:
- (41) the local gain-compensator enhancing the intensity of a darker overlapped region of the overlapped region of the two images stored in the database; and
- (42) the local gain-compensator adding the intensity difference between the darker overlapped region and the overlapped region to the overlapped region with lower intensity.

4. The method for optimizing multiresolution blending of confocal microscope images according to claim 1, wherein step (8) further comprises the steps of:
- (81) the multiscale correlation estimator down-sampling the images stored in the database into a second smallest scale, which is the top level of a second pyramid;
- (82) the multiscale correlation estimator computing a second plurality of correlations with other images pixel by pixel;
- (83) the multiscale correlation estimator eliminating a second plurality of irrational results in order to gain a second highest correlation;
- (84) the multiscale correlation estimator acquiring a second relative position on a second up-left corner of one of the images;
- (85) the multiscale correlation estimator up-sampling the images to the next second level;
- (86) the multiscale correlation estimator searching within a second reasonable range around the second relative position in order to refine the coordinates of the second corner; and
- (87) the multiscale correlation estimator determining whether the second relative position is found in the second finest level, if yes, going to step (9), otherwise, going to step (81).

5. The method for optimizing multiresolution blending of confocal microscope images according to claim 1, wherein step (14) further comprises the steps of:
- (141) the multi-band blender building a large mask [0] as same as the size of a combination of the all images stored in the database;
- (142) the multi-band blender defining at least one region with overlapping as $I^{ov}$ and at least one region without overlapping as $I^{nov}$;
- (143) the multi-band blender labeling pixels in $I^{nov}$ with the same number in the mask [0] as the index k of an image [k];
- (144) the multi-band blender computing pixels in $I^{ov}$ for a distance from the pixel number set in step (143);
- (145) the multi-band blender setting the same number in the mask [0] as a nearest one;
- (146) the multi-band blender building the plurality of mask [0] to mask [k] as large as the size in step (141);
- (147) the multi-band blender filling the pixel number in a mask [i] to one if the pixel number in the mask [0] is i, otherwise, setting the pixel number to 0;
- (148) the multi-band blender smoothing the plurality of masks and images by way of Gaussian filtering with different variances in order to create different bands;
- (149) the multi-band blender separating the different bands;
- (14a) the multi-band blender multiplying each band by a corresponding mask; and
- (14b) the multi-band blender adding all bands together.

6. The method for optimizing multiresolution blending of confocal microscope images according to claim 1, wherein step (14) further comprises the steps of:
- (141A) the multi-band blender proceeding pyramidal correlations;
- (142A) the multi-band blender collecting numerical information from each row of the image;
- (143A) the multi-band blender integrating the numerical information from a Laplacian domain of pyramid representation;
- (144A) the multi-band blender measuring the discrepancy between adjacent rows; and
- (145A) the multi-band blender optimizing the overlapped region by estimating blending coefficients.

* * * * *